(12) United States Patent  
Shields et al.

(10) Patent No.: US 7,529,701 B2
(45) Date of Patent: May 5, 2009

(54) SYSTEM AND METHOD FOR IMPLEMENTING EMPLOYEE STOCK PLANS

(75) Inventors: Lawrence P. Shields, New York, NY (US); George Brewster, Warren, NJ (US); James Humza, Skillman, NJ (US); James Mooney, River Vale, NJ (US); Hermant Bendre, Fair Lawn, NJ (US); Julia K. Burns, Verplanck, NY (US); Joseph Denola, Washington Township, NJ (US); Eileen Eng, Weehawken, NJ (US); Doug Jones, Franklin, TN (US); Michael Kelly, Ramsey, NJ (US); Sudhir Khanna, New York, NY (US); John Rebimbas, East Meadow, NY (US); Mark Trojan, Bayonne, NJ (US); Alla Turetsky, Oradell, NJ (US); Heather Vanderhoof, Belleville, NJ (US)

(73) Assignee: UBS Painwebber, Inc., Weehawken, NJ (US)

( * ) Notice: Subject to any disclaimer, the term of this patent is extended or adjusted under 35 U.S.C. 154(b) by 1211 days.

(21) Appl. No.: 10/003,613

(22) Filed: Nov. 2, 2001

(65) Prior Publication Data

US 2002/0042771 A1    Apr. 11, 2002

Related U.S. Application Data

(63) Continuation-in-part of application No. 09/779,114, filed on Feb. 8, 2001.

(60) Provisional application No. 60/182,399, filed on Feb. 14, 2000.

(51) Int. Cl.
    *G06Q 40/00* (2006.01)
(52) U.S. Cl. .................. 705/35; 705/36 R; 705/37
(58) Field of Classification Search .................. 705/35
    See application file for complete search history.

(56) References Cited

U.S. PATENT DOCUMENTS

| 4,346,442 | A | 8/1982 | Musmanno |
| 4,376,978 | A | 3/1983 | Musmanno |
| 4,566,066 | A | 1/1986 | Towers |
| 4,597,046 | A | 6/1986 | Musmanno et al. |
| 4,648,037 | A | 3/1987 | Valentino |

(Continued)

OTHER PUBLICATIONS

U.S. Appl. No. 09/712,358, filed Jan. 14, 2000, Fitzpatrick, William et al.

*Primary Examiner*—Jagdish N Patel
*Assistant Examiner*—Sara Chandler
(74) *Attorney, Agent, or Firm*—Proskauer Rose LLP

(57) ABSTRACT

Tools for implementing employee stock plans including stock options, restricted stock awards and/or and stock purchase plans are provided. A system is provided that comprises volatile data storage for storing participant information pursuant to a data transfer from a non-volatile database of a third party administrative system; an interface system for interacting with a participant regarding a requested transaction and enabling the participant to select a response pertaining to the employee stock plan; a trading system for conducting individual participant transactions on a public exchange, a communication system that connects a participant to the system; and an updating system that updates the participant information in the volatile data storage according to the selections and transactions made by the participant.

27 Claims, 31 Drawing Sheets

U.S. PATENT DOCUMENTS

| | | |
|---|---|---|
| 4,674,044 A | 6/1987 | Kalmus et al. |
| 4,751,640 A | 6/1988 | Lucas et al. |
| 4,774,663 A | 9/1988 | Musmanno et al. |
| 4,823,265 A | 4/1989 | Nelson |
| 4,953,085 A | 8/1990 | Atkins |
| 4,989,141 A | 1/1991 | Lyons et al. |
| 4,994,964 A | 2/1991 | Wolfberg et al. |
| 5,126,936 A | 6/1992 | Champion et al. |
| 5,132,899 A | 7/1992 | Fox |
| 5,193,056 A | 3/1993 | Boes |
| 5,210,687 A | 5/1993 | Wolfberg et al. |
| 5,214,579 A | 5/1993 | Wolfberg et al. |
| 5,227,967 A | 7/1993 | Bailey |
| 5,233,514 A | 8/1993 | Ayyoubi et al. |
| 5,262,942 A | 11/1993 | Earle |
| 5,592,379 A | 1/1997 | Finfrock et al. |
| 5,631,828 A | 5/1997 | Hagan |
| 5,644,727 A | 7/1997 | Atkins |
| 5,671,363 A | 9/1997 | Cristofich et al. |
| 5,692,233 A * | 11/1997 | Garman .................. 705/36 R |
| 5,758,097 A | 5/1998 | Debe et al. |
| 5,774,880 A | 6/1998 | Ginsberg |
| 5,775,734 A | 7/1998 | George, Jr. .................. 283/57 |
| 5,802,500 A | 9/1998 | Ryan et al. |
| 5,832,461 A | 11/1998 | Leon et al. |
| 5,852,811 A | 12/1998 | Atkins |
| 5,857,176 A | 1/1999 | Ginsberg |
| 5,864,828 A | 1/1999 | Atkins |
| 5,884,285 A | 3/1999 | Atkins |
| 5,991,744 A | 11/1999 | DiCresce .................. 705/36 |
| 6,154,732 A | 11/2000 | Tarbox .................. 705/36 |
| 6,161,096 A * | 12/2000 | Bell .................. 705/36 R |
| 6,173,270 B1 | 1/2001 | Cristofich et al. |
| 6,235,176 B1 * | 5/2001 | Schoen et al. .................. 705/4 |
| 6,269,346 B1 * | 7/2001 | Cristofich et al. ......... 705/36 R |
| 6,571,219 B1 | 5/2003 | Spivey .................. 705/36 |

* cited by examiner

FIG. 3

| XYZ INCORPORATED | |
|---|---|
| | Help    Forms/Info |

Welcome to UBS PaineWebber

Please enter your Social Security Number or Employee ID, and your Personal Identification Number (PIN). Once you have entered these two Items, click on the Submit button to access your menu of available Services. If you make a mistake and would like to clear both the SSN/Employee ID and PIN fields, click on the Reset button.

If your company has issued you an Employee ID, enter that here. Otherwise, enter your Social Security Number.

SSN/Employee ID: [    ]

PIN: [    ]

[ Submit ]  [ Reset ]

| If you are not currently enrolled in your company's stock plan and would like an ID and Password to make a contribution election, click HERE. | If you have forgotten your PIN and would like to request a new one, click HERE. |

FIG. 4

| CORPORATE EMPLOYEE FINANCE SERVICES | | | | |
|---|---|---|---|---|
| HOME | GRANT INFORMATION | TRADE SUMMARY | | ORDER ENTRY |
| QUOTE | STATEMENTS | FORMS | HELP | LOG OUT |

CURRENT QUOTE

163 → PRESENTLY, XXXXXXXXXXX STOCK IS TRADING AT THE NEW YORK STOCK EXCHANGE AT 31.5, DOWN -1.4375. THE DOW JONES INDUSTRIAL AVERAGE IS CURRENTLY AT 8192.48, UP +500.32. WARNING!! MARKET SHIFT!

OPTIONEE INFORMATION

| | |
|---|---|
| SSN/ID: | 0017851 |
| LAST NAME: | WOODBRIDGE, JR |
| FIRST NAME: | JOHN M |
| ADDRESS: | 1705 OCEAN PARKWAY |
| | NEW YORK, NY 10003 |
| WORK PHONE: | 2124685555 |
| HOME PHONE: | 2124458888 |
| PW ACCOUNT NO: | FN30898 |
| FORM ON FILE: | YES |

[ CHANGE PHONE NUMBERS ]    [ ONLINE FORMS ]

FIG. 5

| CORPORATE EMPLOYEE FINANCE SERVICES | | | | |
|---|---|---|---|---|
| HOME | GRANT INFORMATION | TRADE SUMMARY | | ORDER ENTRY |
| QUOTE | STATEMENTS | FORMS | HELP | LOG OUT |

ACCOUNT AUTHORIZATION FORMS

| AUTHORIZATION FORM | |
|---|---|
| INTERNATIONAL ACCOUNT AUTHORIZATION FORM | AVAILABLE |
| ACCOUNT AUTHORIZATION FORM | AVAILABLE |

| HOME | GRANT INFORMATION | TRADE SUMMARY | ORDER ENTRY | QUOTE | STATEMENTS | FORMS | HELP | LOG OUT |

FIG. 7B

JOHN M WOODBRIDGE, JR
1705 OCEAN PARKWAY
NEW YORK, NY 10003

EXERCISE GRANT

OPTIONEE STATEMENT

| OPTION NUMBER | OPTION DATE | OPT. TYPE | OPTION PRICE | OPTIONS GRANTED | OPTIONS VESTED | OPTIONS EXERCISED | TRADING PENDING EXECUTION | CURRENT OPTIONS EXERCISABLE | OPTIONS UNVESTED | OPTIONS CANCELLED | OPTIONS OUTSTAND. |
|---|---|---|---|---|---|---|---|---|---|---|---|
| N01541 | 01/26/1990 | NQ | $8.31 | 40,000 | 40,000 | 24,000 | 200 | 16,000 | 0 | 0 | 14,000 |
| N01514 | 01/24/1991 | NQ | $9.4 | 36,000 | 36,000 | 0 | 300 | 34,000 | 0 | 0 | 30,000 |
| N02178 | 01/23/1992 | NQ | $3.95 | 36,000 | 36,000 | 0 | 300 | 36,000 | 0 | 0 | 36,000 |
| N03153 | 04/15/1993 | NQ | $13.69 | 44,000 | 44,000 | 0 | 300 | 44,000 | 0 | 0 | 44,000 |
| N04034 | 01/25/1995 | NQ | $17.65 | 33,000 | 33,000 | 0 | 300 | 32,000 | 0 | 0 | 32,000 |
| N03214 | 01/17/1994 | NQ | $17.82 | 33,000 | 33,000 | 0 | 300 | 12,000 | 0 | 0 | 32,000 |
| N03215 | 01/26/1994 | NQ | $23.94 | 20,000 | 0 | 0 | 300 | 0 | 20,000 | 0 | 20,000 |
| N03739 | 01/15/1997 | NQ | $33.25 | 18,000 | 0 | 0 | 300 | 0 | 14,000 | 0 | 16,000 |
| | | | TOTAL: | 254,000 | 228,000 | | 300 | 196,000 | 34,000 | | 232,000 |

*184* (pointing to row N01514)

DATA SHOWN ON THIS STATEMENT IS BASED ON INFORMATION MAINTAINED IN THE COMPANY'S STOCK OPTION RECORDS. THE COMPANY RESERVES THE RIGHT TO MAKE CORRECTIONS TO THIS DATA. ALL AWARDS ON THIS STATEMENT ARE SUBJECT TO THE TERMS OF THE GRANTS OF SUCH AWARDS AND THE PLAN UNDER WHICH THE GRANTS WERE MADE.

*185*

Grant Information

| Grant Number | Grant Date | Shares Granted | Grant Price | Vested Shares | Unvested Shares/Units | Cancelled Shares | Shares Available for Sale |
|---|---|---|---|---|---|---|---|
| RS10600 | 04/01/2000 | 5000 | $0.25 | 1250 | 2500 | 0 | 1000 |

Vested shares

| Vest Date | Shares | Shares Cancelled | Shares & Disposition Detail | Shares Pending Sale | Shares Avail. for Sale | Date Shares Avail. for Sale | Vesting Confirm Report |
|---|---|---|---|---|---|---|---|
| 04/01/1999 | 625 | 0 | 125 HLD<br>175 PYTX<br>225 TFO<br>100 SLD | 100 | 600 | 04/01/2000 | pdf |
| 04/01/2000 | 625 | 0 | 125 HLD<br>500 SLD | 500 | 500 | 04/01/2001 | pdf |
| Totals: | 1250 | 0 | | 600 | 1000 | | |

Click on the PYTX code to get tax detail.

Share Disposition Key

- SLD — Sold
- HLD — Held in Plan Account
- PYTX — Used to Pay Taxes
- EXOP — Used to Execute Options
- COTX — Sold to Company to Pay Tax
- TFPW — Transferred to PaineWebber Brokerage Account
- TFO — Transferred out to Bank or Broker/Dealer
- CERT — Certificate Issued
- DFD — Deferred

Unvested shares

| Vest Date | Shares | Shares Cancelled | Date Shares Avail. for Sale |
|---|---|---|---|
| 04/01/2001 | 625 | 0 | 04/01/2002 |
| 04/01/2002 | 625 | 0 | 04/01/2003 |
| 04/01/2003 | 625 | 0 | 04/01/2004 |
| 04/01/2004 | 625 | 0 | 04/01/2005 |
| Totals: | 2500 | 0 | |

CORPORATE EMPLOYEE FINANCE SERVICES

ORDER ENTRY

| | GRANT NUMBER *372* | GRANT DATE *374* | OPTION PRICE *376* | EXERCISABLE SHARES *378* | SHARES TO BE SOLD *380* |
|---|---|---|---|---|---|
| SAME DAY SALE *381* | N01541 ☑ | 01/26/1990 | $8.21 | 15,300 | 200 |
| SELL TO COVER *383* | N01814 ☐ | 01/24/1991 | $9.4 | 36,000 | |
| SELL TO RAISE SHARES *385* | N02178 ☐ | 01/23/1992 | $8.75 | 36,000 | |
| | N00022 ☐ | 04/15/1993 | $13.69 | 44,000 | |
| SELL TO RAISE CASH *387* | N02553 ☐ | 01/27/1994 | $17.66 | 32,000 | |
| | N04936 ☐ | 01/25/1995 | $17.82 | 32,000 | |
| CASHLESS *389* | | TOTAL QUANTITY: | | 195,300 | |

370

*382* — ORDER TYPE: [LIMIT ▼]   PRICE: [75] — *384*

*386* — DURATION: [GTC ▼]

*388* — PROCEEDS: [ACCOUNT ▼]

*390* → [REVIEW ORDER]   [CLEAR ORDER]

| HOME | GRANT INFORMATION | TRADE SUMMARY | ORDER ENTRY | QUOTE | STATEMENTS | FORMS | HELP | LOG OUT |

FIG. 15

CORPORATE EMPLOYEE FINANCE SERVICES

REVIEW ORDER

PLEASE CONFIRM THE FOLLOWING ORDER:

402 — LIMIT GTC ORDER
AT A LIMIT PRICE OF 60
TO SELL

200 SHARES FROM N01541 GRANT,
GRANTED ON 01/26/1990,
FOR AN OPTION PRICE OF 8.21

404 — [SUBMIT ORDER]   [REJECT]

| HOME | GRANT INFORMATION | TRADE SUMMARY | ORDER ENTRY | QUOTE | STATEMENTS | FORMS | HELP | LOG OUT |

```
┌─────────────────────────────────────────────────────────────┐
│            CORPORATE EMPLOYEE FINANCE SERVICES              │
├─────────────────────────────────────────────────────────────┤
│                                                             │
│  CANCEL ORDER                                               │
│           YOU ARE CANCELING FN5043 ORDER WITH OPEN QUANTITY 200 SHARES,
│  412 ──── WHICH WAS PLACED 02/06/1998 AT 10:19:58 AS GTC WITH PRICE $75
│           PER SHARE. LIMIT PRICE FOR THIS ORDER IS $75 PER SHARE AND THE GTC
│           EXPIRATION DATE IS 03/06/1998.
│
│  410              PLEASE CHOOSE ONE FROM THE FOLLOWING OPTIONS:
│   ↘      ⦿ FULL CANCEL
│  414 ──→ ○ CANCEL REPLACE        NEW PRICE: $ [        ]
│           NOTE: IF YOU CHOOSE "CANCEL REPLACE" OPERATION, PLEASE MAKE SURE TO SPECIFY THE NEW PRICE.
│
│                    [ INITIATE CANCELLATION ]  [ RESET ]
│                               416              418
│  | HOME | GRANT INFORMATION | TRADE SUMMARY | ORDER ENTRY | QUOTE | STATEMENTS | FORMS | HELP | LOG OUT |
└─────────────────────────────────────────────────────────────┘
```

FIG. 17

CORPORATE EMPLOYEE FINANCE SERVICES

GRANT INFORMATION (DETAILED)

| GRANT NUMBER | GRANT DATE | GRANT PRICE | OPTION TYPE | OPTIONS GRANTED | OPTIONS EXERCISED | OPTIONS EXERCISABLE |
|---|---|---|---|---|---|---|
| 100145 | 01/23/1986 | $8.92 | ISO | 12,008 | 12,000 | 0 |

420 →

| EXERCISE DATE | OPTION PRICE | SHARES EXERCISED | SALES PRICE | COMMISSIONS | OPTION COST | COST OF GRANT |
|---|---|---|---|---|---|---|
| 12/09/1992 | $8.92 | 7,200 | 0 | 0 | | $64,224 |
| 09/02/1987 | $8.92 | 4,800 | 0 | 0 | | $42,896 |

ELECTIONS    MY PROFILE

| HOME | GRANT INFORMATION | TRADE SUMMARY | ORDER ENTRY | QUOTE | STATEMENTS | FORMS | HELP | LOG OUT |

FIG. 18

| | | CORPORATE EMPLOYEE FINANCE SERVICES | | | | | | |
|---|---|---|---|---|---|---|---|---|

TRADE SUMMARY

| CANCEL ORDER | SEQUENCE NUMBER | ENTRY DATE | QUANTITY | STATUS | ORDER TYPE | PRICE | EXECUTION DATE |
|---|---|---|---|---|---|---|---|
| CANCEL | FA5043 | 02/06/1998 | 200 | OPN | GTC | $55 | N/A |
| | FA5042 | 02/05/1998 | 200 | EXE | GTC | $60 | 02/05/1998 |
| | FA5041 | 02/05/1998 | 100 | EXE | MKT | $10 | 02/05/1998 |
| | FA5030 | 02/04/1998 | 100 | PCXL | DAY | N/A | N/A |
| | FA5029 | 02/04/1998 | 100 | EXE | DAY | $56 | 02/04/1998 |

424 →

ELECTIONS    MY PROFILE

| HOME | GRANT INFORMATION | TRADE SUMMARY | ORDER ENTRY | QUOTE | STATEMENTS | FORMS | HELP | LOG OUT |

FIG. 19

| | CORPORATE EMPLOYEE FINANCE SERVICES | | | | | | |
|---|---|---|---|---|---|---|---|

TRADE SUMMARY (DETAILED)

| SEQUENCE NUMBER | DATE | TIME | STATUS | ORDER TYPE | OPEN QUANTITY | PRICE | CUMULATIVE EXECUTED |
|---|---|---|---|---|---|---|---|
| FA5042 | 02/05/1998 | 15:10:07 | EXE | GTC | 200 | 60 | 0 |
| | 02/05/1998 | 15:11:19 | EXE | GTC | 0 | 60 | 200 |

426 →

ELECTIONS    MY PROFILE

| HOME | GRANT INFORMATION | TRADE SUMMARY | ORDER ENTRY | QUOTE | STATEMENTS | FORMS | HELP | LOG OUT |

FIG. 20

CORPORATE EMPLOYEE FINANCE SERVICES

ORDER CONFIRMATION
    PLEASE RECORD THE FOLLOWING INFORMATION ABOUT YOUR ORDER:
        YOUR ORDER HAS BEEN SENT TO THE EXCHANGE.
430 →     THE ORDER REFERENCE NUMBER IS FA5044.
        PLEASE RECORD THIS NUMBER FOR THE FUTURE REFERENCE.
    ELECTIONS    MY PROFILE    CHECK STATUS

| HOME | GRANT INFORMATION | TRADE SUMMARY | ORDER ENTRY | QUOTE | STATEMENTS | FORMS | HELP | LOG OUT |

FIG. 22

> CORPORATE EMPLOYEE FINANCE SERVICES
>
> CANCEL ORDER CONFIRMATION
>
> 440 →   YOUR REQUEST WAS PERFORMED SUCCESSFULLY.
> ORDER FN5043 WAS SENT FOR CANCELLATION.
> PLEASE REFLECT IT IN YOUR RECORDS.
>
> ELECTIONS    MY PROFILE
>
> | HOME | GRANT INFORMATION | TRADE SUMMARY | ORDER ENTRY | QUOTE | STATEMENTS | FORMS | HELP | LOG OUT |

FIG. 23

| | CORPORATE EMPLOYEE FINANCE SERVICES | | ELECTIONS |
|---|---|---|---|
| XXXXXXXXXXXXXX | HOME    GRANT INFORMATION    TRADE SUMMERY | | ORDER ENTRY |
| | QUOTE    STATEMENTS    FORMS    HELP | | LOG OUT |

UPDATING OPTIONEE INFORMATION

SSN/ID:          0017851
    LAST NAME:     WOODBRIDGE, JR
    FIRST NAME:    JOHN M
    ADDRESS:       1705 OCEAN PARKWAY
                     NEW YORK, NY 10003
    WORK PHONE:   [2124685558]
    HOME PHONE:   [2124458886]
    PW ACCOUNT NO: FN30898
    FORM ON FILE:  YES

450

[ SUBMIT CHANGES ]   [ RESET ]

| HOME | GRANT INFORMATION | TRADE SUMMARY | ORDER ENTRY | QUOTE | STATEMENTS | FORMS | HELP | LOG OUT |

International Wire (Intranet)

PaineWebber - Bank International Wire Request Form

Instructions: PaineWebber recommends you contact your bank or financial institution to verify instructions for your wire. Section 1 and 3 are required for all wires. Please complete Section 4 if applicable.

*Fields with (\*) next to them are not required.*

SECTION 1 - OPTIONEE INFORMATION (REQUIRED):

| | |
|---|---|
| Name: | EVELIO AQUINO |
| Address: | C.MALDONADO 114 |
| | FRAC'C. JESUS TERAN |
| | AGUASCALIENTES, AGS., AG 20290 MEXICO |
| Account Number: | 0011470 |

Home Phone: [ ]   Work Phone [ ]   Fax [ ] *

SECTION 2 - INTERNATIONAL WIRE INSTRUCTIONS (REQUIRED):
Please complete either Section A or B below, depending on the type of currency/bank of dollar/

A. INTERNATIONAL CURRENCY BUYS/CONVERSIONS - Fee Waived (For local currency sent to non-U.S. banks only)

Exchange from U.S. Dollars to:
Currency [US Dollars ▼]

Destination Country of Receiving Bank [United States ▼]

Your Bank's SWIFT Number [ ]

If your currency is one the following:

| Currency and Code Type | Other |
|---|---|
| Australian Dollars (BSB Code 6-Digit Code) ▼ | [ ] |

B. INTERNATIONAL WIRE TRANSFER - $25.00 Fee (U.S. Currency sent to non - U.S. banks)

U S Clearing/Bank's ABA Number [ ]
U S Clearing/Correspondent Bank Name [ ]
Your local bank's account number at U.S. Clearing Bank [ ] *

SECTION 3 - YOUR BANK ACCOUNT INFORMATION (REQUIRED):

Name of Your Bank: [ ]
Your Bank's Address
[ ]
[ ]
Country [ ]
Your Bank's Phone # [ ]
Your Name as it Appears on the Account [ ]
Your Account Number [ ]

SECTION 4 - FOR FURTHER CREDIT INSTRUCTIONS:

For further credit for:
Your Name as it Appears on the Account [ ] *
Financial Institution [ ] *
Account Number [ ] *

For further credit for:
Your Name as it Appears on the Account [ ] *
Financial Institution [ ] *
Account Number [ ] *

SECTION 5 - Opinions:
Please, enter any comments are that required.
[ ]
[ ]

Last Updated By: rpalilla

Date: 09/01/2000

[ Save As Current ]

[ Submit ] [ Cancel ]

FIG. 27

| PaineWebber's Stock Options Financing - Microsoft Internet Explorer | | | | | | | |
|---|---|---|---|---|---|---|---|
| PaineWebber Corporate Stock Benefit Services | Home | Participant Info | Company Info | Other Functions | Nav | Help | Logout |

Change Password    Select Plan: ESPP ▼

Company:    XYZ Corporation
Vest Date:    01/01/01
User:    vic

Sell All    855
                                 Sell Remaining    1237
                             Total Block Order    <u>2092</u>
                      Shares Remaining to Sell    2092

| Date | TubaRef# | Shares | Price | Avg Price |
|---|---|---|---|---|

TubaRef#   Shares    Price
| 0 | | |    Add Execution |

SUBMIT TRADES TO MARKET

FIG. 28

CHECKS AND JOURNALS APPROVAL

Client Company Name. _____  Plan. ESOP  Ticker _____  Security #: _____  Omnibus Acct #: _____

| Total Shares 55,277 | Total Amount 259,852 | Total Tax: 4,575 | Total Proceeds 276,389 |

← Client Company's summary information

| Employee Name | EID/SSN | Acct | Sale Price | Shares | Amount | Tax | Journal Approval | Proceeds | Payment Type | Check # | Check Approval | Date1 | Date2 |
|---|---|---|---|---|---|---|---|---|---|---|---|---|---|
| Smith | 1234567 | 1234 | 20.49 | 12345 | 240648 | 42.98 | A | 250965 | Fed Wire | 0056789 | D | 12/23/00 | 09/25/00 |
| Jones | 8973547 | 4567 | 11.50 | 50000 | 550000 | 56.32 | A | 5750054 | Int'l | 0056735 | D | 08/17/00 | 07/09/00 |
| Parnelli | 1597834 | 7891 | 35.89 | 45800 | 130587 | 75.09 | D | 1584643 | Wire | 0056699 | A | 01/31/00 | 08/23/00 |
| Radski | 2222222 | 2222 | 50.59 | 29000 | 159753 | 12.56 | A | 1759843 | Check | 0056700 | A | 02/14/00 | 06/30/00 |

Approval Click-on-boxes

SYSTEM AND METHOD FOR IMPLEMENTING EMPLOYEE STOCK PLANS

CROSS REFERENCE TO RELATED APPLICATIONS

This application is a continuation-in-part of U.S. patent application Ser. No. 09/779,114, filed Feb. 8, 2001, entitled "System And Method For Execution Of Trades Made Pursuant To Stock Option And Purchase Plans," which in turn claims the benefit of U.S. Provisional Patent Application No. 60/182,399, filed Feb. 14, 2000, both of which are incorporated herein by reference.

BACKGROUND OF THE INVENTION

1. Field of the Invention

The present invention relates to financial business systems; and more particularly to a system and method for inquiry and processing of trades made pursuant to employee stock plans, including employee stock option plans, restricted stock award plans, and employee stock purchase plans.

2. Description of the Prior Art

In recent years, employee stock ownership through stock plans has become a popular form of incentive compensation. Stock ownership provides an opportunity for employees to share in the growth potential of a company, thereby creating work incentives. Stock plans are easy for the sponsoring company to establish, primarily because they do not require any financial targets. They also offer numerous other advantages to employees and employers alike. For example, stock ownership provides the ability to realize unlimited gains. Ownership can also be tailored to specifically benefit those employees whose actions impact the stock value. For employers, stock ownership enables a company to attract and keep talented employees without draining cash reserves to pay high salaries. Employee stock plans include Employee Stock Options Plans (ESOPs). A stock option is a right granted by a company to an employee to purchase a fixed number of shares of stock at specified price and within a specific period of time. Stock options include nonqualified options which are taxed as ordinary income, and incentive options, which are eligible for special tax treatment if held long enough after the exercise and grant date. When the stock options vest, they can be exercised to obtain shares. The shares can then be held or sold by the employee. The decision to exercise stock options depends on a number of factors, including the value of the underlying stock, taxes, timing and employee financial circumstances. Like stock options, Employee Stock Purchase Plans (ESPP's) afford a method for employees to purchase company stock, through payroll deductions or otherwise. Employers purchase company stock for participating employees on a scheduled basis, such as two times per year, based on the money accumulated for the participating employee up to that time. Employers may also implement Restricted Stock Award (RSA) plans. Restricted stock can be acquired by an employee in various ways, including through the exercise of stock options, as bonus shares, or as compensation. As the name implies, various restrictions are placed on the employee's ability to sell these types of shares.

There has been recognition that computer-based financial systems can be used to automate the stock option exercise process. U.S. Pat. No. 4,823,265 to Nelson discloses a system and method for processing transactions in renewable options in stocks and other securities using a computer-based system. The system provides for the automatic renewal of options for a fixed term, until a designated event occurs, or perpetually. U.S. Pat. No. 5,671,363 to Cristofich et al. is directed to a data processing system for administration of stock option accounts that manages and tracks a plurality of individual accounts, current stock pricing, individual biographic data, company option plans and current withholding and other tax requirements. The system exercises select options pursuant to a specific participant request or the happening of an event, such as the market obtaining a participant selected target price for a security. The system accomplishes this task by real-time access to participant information pertaining to present or future stock option rights. Once exercise is effectuated, the system bundles the individual transactions across multiple participants and sends this to the exchange as a single security transaction. The system uses a corresponding brokerage account held in the participant's name to implement the actual trades of stock necessary for option exercise.

Neither the Nelson nor the Cristofich et al. systems are capable of processing trades made pursuant to both company sponsored stock option and stock purchase plans. In addition, these are complicated systems, requiring substantial means to support the automatic processing of option transactions upon the happening of a specific event.

There remains a need in the art for a simplified system for implementing employee stock plans, which does not require a concomitant full-service brokerage account or real-time access to employee demographic information. Moreover, there is a need for a full-featured system that provides comprehensive services and features to the employee/participant, employer, internal users and others, in an efficient manner.

The present invention provides a system and method having the above and other advantages.

SUMMARY OF THE INVENTION

The present invention provides tools for implementing employee stock plans, including ESOPs, RSAs and ESPPs. Moreover, the system can be used to implement restricted stock award plans, either independently or in conjunction with the other plans, in particular, ESOPs. Generally, the system comprises a volatile data storage for storing participant information pursuant to a data transfer from a non-volatile database of a third party administrative system; an interface system for interacting with a participant regarding a requested transaction and enabling the participant to select a response pertaining to the employee stock plan; a trading system for conducting individual participant transactions on a public exchange; a communication system that connects a participant to the system; and means for updating the participant information in the volatile data storage according to the selections and transaction made by the participant. The communication system comprises conventional access technology such as an interactive voice response system (i.e., telephone interface), or an internet or intranet interface. In addition, the system allows participant employees to exercise, hold and/or sell stock via a number of different vehicles, including cash, cashless, sell to cover, sell to raise shares, sell to raise cash, or stock swap. The system also includes a reporting system that enables a corporate employer to run a report based on the participant information. As such, the system can be readily adapted to the needs of different participants/employees. Advantageously, the system does not require a concomitant full-service brokerage account, or real-time access to employee demographic information. Thus, the system can accommodate an unlimited number of participants and sponsoring employers.

In another aspect the invention includes a rule system for ascertaining whether the sale price of an order to exercise a stock option or sell a share is equal or less than the limit price and if so, preventing further processing of the order.

In yet another aspect, the invention provides a reporting system for at least one employee stock plan including a computer-implemented finance system for processing a transaction pursuant to the employee stock plan. The finance system includes a volatile data storage for storing participant information pursuant to a data transfer from a nonvolatile database of a third party administration system; an interface system for interacting with participants regarding requested transactions, and a reporting system that enables a corporate employer to run a report based on the participant information and in accordance with respective client profiles.

Another aspect of the invention provides a system for use by a financial services organization in performing block trades for at least one employee stock plan. The system includes a computer-implemented finance system for processing a transaction pursuant to the at least one employee stock plan including a volatile data storage for storing participant information pursuant to a data transfer from a nonvolatile database of a third party administration system; and a computer-implemented interface system for interacting with participants regarding requested transactions, and for interacting with at least one user associated with the financial services organization to perform block trades on behalf of the participants for shares acquired by the participants via the at least one employee stock plan. The system also includes means for updating the participant information in the volatile data storage according to the block trades performed.

Yet another aspect of the invention provides a check and journal process associated with a system for administering at least one employee stock plan. The system includes a computer-implemented finance system for processing a transaction pursuant to the employee stock plan including a volatile data storage for storing participant information pursuant to a data transfer from a nonvolatile database of a third party administration system; and an interface system for interacting with participants regarding requested transactions, and for interacting with at least one user associated with the financial services organization to enable the user to review trade entries for the employee stock plan, and in response thereto, enter an approved or disapproved status for at least one of an associated check process and an associated journal. Also, means are provided for linking the check process and the journal process such that an entry made by the user for the journal process is automatically carried over to a related entry for the check process.

In accordance with the invention described herein, employers can provide employees with incentive compensation that can be used in a simplified, unified, user friendly and streamlined process.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 3 illustrates a participant enrollment logon page of a web-based interface;

FIG. 4 is a display of a web-based interface system illustrating a market warning;

FIG. 5 is a display of a web-based interface system illustrating an authorization form request window;

FIG. 7B is a display of a web-based interface system illustrating possible options in accordance with the logic of FIG. 7A;

FIG. 7C illustrates a web-based system display for enabling a participant to review or accept restricted stock grants;

FIG. 14 is a display of a web-based interface system for an order entry;

FIG. 15 is a display of a web-based interface system for reviewing an order;

FIG. 16 is a display of a web-based interface system for canceling an order;

FIG. 17 is a display of a web-based interface system for providing grant information;

FIG. 18 is a display of a web-based interface system for providing a trade summary;

FIG. 19 is a display of a web-based interface system for providing detailed trade summary;

FIG. 20 is a display of a web-based interface system for order confirmation;

FIG. 22 is a display of a web-based interface system for cancel order confirmation;

FIG. 23 is a display of a web-based interface system for updating optionee information;

FIG. 25 illustrates a screen display for running a report template;

FIG. 26 illustrates an international wire request form;

FIG. 27 illustrates a block trading screen;

FIG. 28 illustrates a checks and journals principal screen; and

DETAILED DESCRIPTION OF THE INVENTION

The present invention relates to an interactive computerized system for automating the processes and procedures common to inquiry of option and/or stock status and execution of trades made pursuant to employee stock plans, including employee stock option plans (ESOPs), employee stock purchase plans (ESPPs), and Restricted Stock Award (RSA) plans. It provides participants with the ability to view stock option, stock purchase, and restricted stock account information, issue orders and receive proceeds. In accordance with the invention, employers can provide employees with incentive compensation that can be used by means of a simplified, unified, user friendly and streamlined process.

Generally, the present invention provides a system for inquiry and processing of trades made pursuant to an employee stock plan, and comprises a finance system for automatic processing of a transaction pursuant to the stock plan, the finance system including a volatile data storage for storing participant information pursuant to a data transfer from a nonvolatile database of a third party administration system; an interface system for interacting with a participant regarding a requested transaction; a trading system for conducting individual participant transactions on a public exchange; and a communication system that connects a participant to the finance system.

Figure 1:
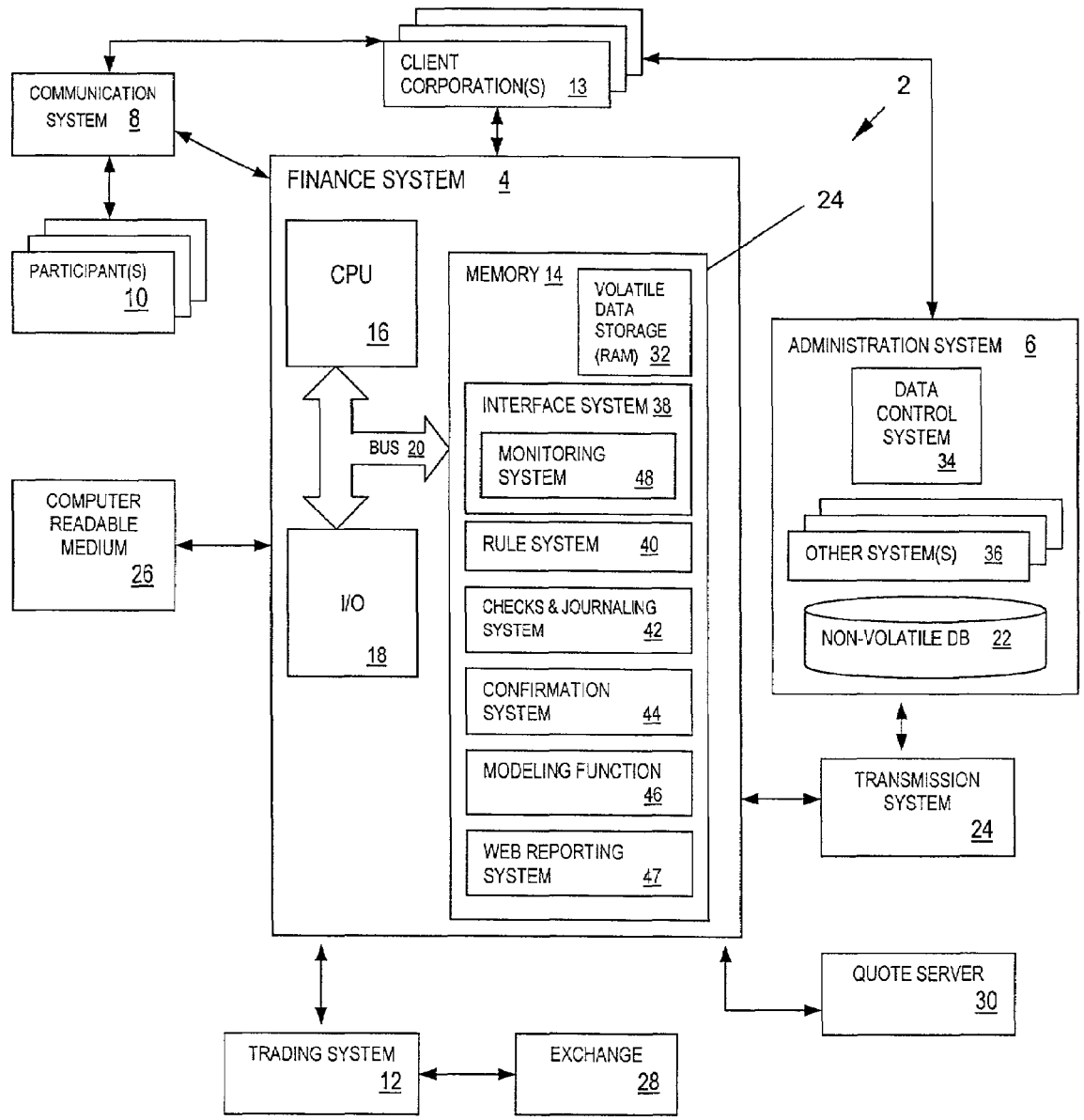
FIG. 1 is a block diagram depicting the functional components of the present system.

FIG. 1 illustrates an employee stock plan system 2. Stock plan system 2 comprises a finance system 4, a communication system 8 that connects a participant 10 to finance system 4 and a trading system 12 for the trading of individual transactions on a public exchange 28. Also shown with system 2 is a third party administration system 6, which will be further defined below. Additionally, a client company 13 may interact with the finance system 4 via a communication system 8, e.g., to access a web reporting function 47, and with the administration system 6. Finance system 4 is typically operated under the control of a financial services organization, and serves as a central processing component and as an interface for other peripheral components relative to stock plan transactions. Third party administration system 6 serves as an interface for a client (e.g., a corporate employer) and participants (e.g., the employer's employees) relative to establishing an entity as a client or participant, inputting and updating client or participant information, tracking participant accounts, and other administrative functions. As discussed in detail later, nonvolatile database 22 resident in third party administration system 6 houses participant particulars and client information. Thus, as used herein, nonvolatile database 22 refers to information storage which is not resident in finance system 4, and is not of a transient nature. It should be noted that administration system 6 does not constitute a part of the present invention. Any description relative to administration system 6 is provided for clarity of understanding system 2.

One with skill in the art will recognize that while finance system 4 and administration system 6 are separate systems, they may have fairly similar operative structure, i.e., hardware. For instance, finance system 4 preferably includes a memory 14, a central processing unit (CPU) 16, an input/output device (I/O) 18 and a bus 20. The finance system 4 may include a mainframe computer, for instance, to provide such capabilities. Systems 4 and 6 may also, of course, include nonvolatile data storage such as a nonvolatile database 22 of administration system 6.

Within each system 4, 6, memory may comprise any known or hereafter developed type of data storage system and/or transmission media, including magnetic media, optical media, random access memory (RAM), read only memory (ROM), a data object, and the like. Memory may reside at a single physical location comprising one or more types of data storage, or be distributed across a plurality of physical systems. Each respective CPU may likewise comprise a single processing unit, or a plurality of processing units distributed across one or more locations, e.g., on a client and server. Each respective I/O may comprise any known or hereafter developed type of input/output device including a network system, modem, keyboard, mouse, voice recognition system, CRT, printer, disc drives, etc. Additional components, such as cache memory, communication systems, system software, etc., may also be incorporated into each system 4, 6.

As recognized in the field, each system 4, 6 may independently include one or more central computers/servers, such as mainframe computers. Here, system satellite servers may each contain only one system/module with the remainder of the systems/modules resident on a centrally located server. In another embodiment, a number of servers may be present in a central location, each having different software applications resident therein. Alternatively, a number of servers may reside in a central location, each containing all of the systems/modules resident therein. These servers may comprise an advanced mid-range multiprocessor-based server, such as the Ultra II from Sun Microsystems or the RS6000 from IBM, utilizing standard operating systems, software written in C++, Java or a similar language, which is designed to drive the operation of the particular hardware and is compatible with other system components, and I/O controllers.

It should be emphasized that while finance system 4 and administration system 6 may independently include distributed systems/modules/memory, as described above, systems 4, 6 do not share structure except for a transmission system 24 for communication there between, that is, administration system 6 is non-resident and is remote relative to finance system 4.

Each system 4, 6 includes a program product that, when executed by their respective CPUs, comprises various functional capabilities owned by each system. For instance, in terms of finance system 4, memory 14 preferably includes a program product 24. In the following discussion, it will be understood that the method steps discussed preferably are performed by a processor executing program product/instructions stored in memory of each system 4, 6. Program product can be initially loaded into memory of each system 4, 6 from, for example as shown for finance system 4, a computer readable medium 26. It is understood that the various devices, modules, mechanisms and systems described herein may be realized in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be used. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Peripheral components of stock plan system 2 may include a transmission system 24 for data transfers between finance system 4 and administration system 6, a public exchange 28, as will be described in more detail below, and a quote server 30. Quote server 30 provides real-time stock market quotes to finance system 4. In particular, quote server 30 preferably provides stock quotes for the participant's employer and also quotes for the major indices such as the Dow Jones Industrial Average, the S&P 500 and the NASDAQ Composite index. A preferred server is the Reuters Quotron server.

Once access to finance system 4 is complete, participant 10 selects a transaction of interest. For purposes of this disclosure, the term "transaction" may be used to refer to all of a participant's activity relative to finance system 4, e.g., inquiring of option and/or stock status, accepting grants of stock options or restricted stock, making plan contributions and distribution and tax elections, issuing full or partial sale orders and receiving proceeds. As will be described below, each request is processed by system logic in accordance with a set of rules pertaining, e.g., to the inquiry of option and/or stock status and the execution of trades made pursuant to employee stock plans. Participant trade orders generated by finance system 4 are forwarded to trading system 12 for transmission to exchange 28. Confirmation of executed orders may be forwarded to participant 10 via U.S. mail when the trade settles (i.e., 3-5 business days after execution). Related participant information is resident in volatile data storage 32 of memory 14 of finance system 4 pursuant to at least one daily data transfer from nonvolatile database 22 of administration system 6 via transmission system 24. Preferably, participant information is stored on computer-readable disks with the random access memory of finance system 4 and loaded with participant information as transactions occur. Accordingly, volatile data storage 32 does not require, but may include, associated permanent data storage. The activity for all participants in a given time period is stored in finance system 4 and transmitted back to nonvolatile database 22 of administration system 6 via at least one daily data transfer. A data control system 34 of administration system 6 thereafter updates participant information in accordance with the data transmission. Thus, the participant information does not permanently reside within the volatile data storage 32 of the finance system 4. By avoiding the need to store and process all participant data, the complexity of the finance system 4 is thereby significantly reduced. Conversely, nonvolatile database 22 provides a less transient storage for participant-related data.

A participant 10 provides the cash or stock available to fund transactions through limited brokerage accounts. As used herein, a "limited brokerage account" only maintains participant information regarding employer-sponsored stock plans. Such information, for example, is described with reference to the participant information stored in volatile data storage 32. The participants may have one account for both stock purchase transactions and option transactions. A limited brokerage account should be contrasted with a full-service brokerage account, which requires more comprehensive participant particulars, such as provided by section 405 of the New York Stock Exchange constitution and rules. Thus, cash and/or stock is resident in a participant's limited brokerage account to fund transactions. Alternatively, a participant 10 may forward cash via check, money order or bank wire or forward stock to the limited brokerage account to fund a transaction. A participant may also forward a check, money order, bank wire or stock to fund the taxes, commissions, and fees associated with a given transaction.

Transactions may also proceed on a cashless, sell to raise shares, sell to raise cash, cash, or sell to cover basis. Moreover, stock swaps may be implemented for the transactions, e.g., at the nonvolatile database. As used herein, a cashless exercise refers to the disposal of stock shares without an initial contribution by participant 10. A cash exercise refers to the disposal with an initial contribution for taxes or fees. For a cash exercise, fair market value is the exercise price, not the current market price. For option exercise, where the option price is below the market price (which usually is the case), the shares are exercised at market price with the option grantor (i.e., company) receiving the option price for the shares and participant 10 receiving the remaining proceeds (i.e., market price minus option price and transaction costs.). A stock swap involves the use of company stock directly contributed by participant 10. Assuming participant 10 has sufficient stock to cover the option cost, taxes, fees and commissions associated with the trade, these will be deducted from the new stock purchased without participant exercise of the stock already owned to cover these costs. In a sell to cover transaction, the participant need only dispose of sufficient stock to pay for the option cost, taxes, fees and commissions associated with a given transaction. Likewise, with sell to raise cash or sell to raise share transactions, the participant need only dispose of sufficient stock to cover the transaction costs with the specified cash, or quantity of desired shares, respectively, available to the participant. Participants with stock shares acquired as the result of a stock purchase plan can likewise dispose of shares such that the fees associated with the transaction are deducted from the net proceeds, or use a stock swap. ESPP transactions include sell, electronic transfer, and physical certificate requests. Participants with restricted stock grants can elect how to pay taxes, and, post vesting, can elect to sell, electronically transfer, and request a physical certificate. Accordingly, each participant need not have an established brokerage account to use the system of the present invention. This allows the system to accommodate a greater number of employees and employers than heretofore known in the art.

Communication system 8 provides a means by which a participant 10 interacts with finance system 4. Communication system 8 may be provided in the form of a telephonic communication, the Internet, or through an Intranet interface, e.g., operated by employees of the financial services organization that runs the finance system 4. Such employees may be licensed securities brokers, e.g., under NASD Series 7 (National Association of Securities Dealers), who provide limited brokerage services (i.e., exercise of options and/or the sale of shares) for the employee stock plans. The participant 10 may interact with the broker by telephone, e-mail, personal contact or other means. The broker, in turn, interacts directly with finance system 4 through, e.g., the Intranet interface. The type of communication system 8 will determine the connectivity of communication system 8 to finance system 4. For example, Internet and Intranet connectivity may use standard TCP/IP sockets-based protocol to connect to system 4. Likewise, telephonic connectivity may use conventional T1 connections.

Preferably, communication system 8 is equipped with a backup system for providing communication access to finance system 4 if the primary communications means in use is not functioning. If both of the primary and backup telephonic systems are malfunctioning, communication system 8 can route incoming telephone calls to a customer service representative (CSR). Similarly, a conventional Internet traffic load distribution device, such as the Cisco DistributedDirector, may be used to detect failure at an Internet site and route Internet requests to an alternative site.

While particular exemplary types of communication systems 8 have been noted, it should be recognized that other known or later developed systems may also be used.

Trading system 12 accepts participant orders from finance system 4 and immediately forwards these to an exchange 28 for execution. When exchange 28 is closed, typically between 4:00 p.m. and 9:30 am on normal trading days, on weekends and on holidays for a public exchange, trading system 12 stores participant orders until about 7:00 am on the next trading day, at which time the trades are forwarded to exchange 28 for execution.

Referring still to FIG. 1, the third party administration system 6 provides a means by which a client company may be integrated into the system 2 such that the associated participant information can be entered, updated and tracked. Administration system 6 interacts with participants 10 relative to the more rudimentary tasks of participant information input, updating, and the like. Finance system 4 is more efficient as a result because it does not have to interact with client companies.

Administration system 6 includes a data control system 34 that manipulates, manages and updates participant and other information stored in nonvolatile database 22, and may also include other system(s) 36 known in the art for accessing the system, interfacing with system 6, and the like.

In accordance with the invention, "participant information" may pertain to client employer-related participant-specific information such as name, address, social security number, personal identification number (PIN), participant position (i.e., the number of shares owned), option exercise and/or purchase and sale history for stock shares, vest dates and expirations, option and restricted stock grants, information pertaining to the type of compensation offered by a particular employer (i.e., type or types of employee stock plans), various elections made by the employee such as amount of payroll deduction (for stock purchase plans), proceeds distribution instructions, tax payment instructions, and whether or not the participant is considered an insider pursuant to the New York Stock Exchange constitution and rules and/or Securities and Exchange Commission (SEC) code. Advantageously, this information can be customized for each client employer, as well as for different plans offered by the same employer. For example, a client employer may offer only an ESOP, ESPP, or RSA, or any combination thereof. In another instance, the client may charge certain fees for the exercise of options and/or purchases while another employer may not. This flexibility also allows system 2 of the present invention to accommodate international employers and employees and their differing needs. For example, tax consequences for non-U.S. citizens and residents can vary significantly because tax laws vary from one country to the next.

Useful standardized data control system 34 software may be obtained from Transcentive, Inc., Equity Edge/E*Trade Business Solutions, or others in a similar format. As indicated above, participant information stored in non-resident nonvolatile database 22 is transferred to volatile data storage 32 of finance system 4 pursuant to a daily data transfer. Volatile data storage 32 may also contain data from data sources other than administration system 6. For example, and as discussed in greater detail later, data pertaining to wire instructions and authorization may be imported into volatile data storage 32 from another outside database/system. Wires, account authorizations, electronic share transfer, tax and physical certificate instructions are not transmitted back to administration system 6, while ESPP share disposition (certificate, transfer, sale) are. Generally, the transfer of participant information occurs during hours when the exchanges 28 are closed, typically between 4:00 PM and 9:30 am during the week and during weekends and holidays. System 2 automatically batches trade information at the end of the trading day (e.g., 4:30 PM) from trading system 12 to finance system 4. This trade information is then manually transferred to administration system 6 for processing (e.g., between 5:00 p.m. and 9:00-10:00 PM). After appropriate processing, the updated participant information is thereafter periodically transferred back to finance system 4 either manually or automatically prior to the opening of the next trading day, typically between the hours of 9:00-10:00 p.m. and 7:00 am. In some instances, data may be transferred to finance system 4 more than one time. By way of illustration, after a trade has been executed, the trade information is transmitted to administration system 6 pursuant to the daily data transfer, where the appropriate option cost, withholding taxes, commissions and fees are ascribed to the trade by the applicable company contract information. The resulting data is then transmitted back to finance system 4 for further processing (i.e., confirmation) and distribution (discussed in greater detail later).

The administration system 6 may be updated with participant information, including adding new participants 10, modifying trading and vesting dates, revising the number of options and/or shares available for exercise and/or sale for each participant 10 in response to, for example, recently executed transactions, employer grant, expiration dates, or the like. Advantageously, updating of each participant position is performed by administration system 6 in accordance with customization applicable to that participant's employer. The resulting information is then transmitted back to finance system 4.

Administration system 6 also provides a platform for adding a new client company/employer to system 2. These companies are clients of the financial services organization that runs the finance system 4. In this instance, the company furnishes information for processing by administration system 6, including company profile (general information regarding the company), plan information, account profile, grant profile, tax information, dispositions, contact information, termination information, participant particulars, exercise information, etc. This client information is thereafter forwarded to finance system 4 where it is validated for use. Use of a separate administration system 6 in this manner permits an unlimited number of client companies to be accommodated by the present invention. In view of the foregoing, administration system 6 provides a means by which participants 10 and client companies can be added, participant information maintained and updated without interfering with, or complicating, finance system 4. For example, the computational and data storage resources of the finance system 4 are not burdened since the administration system 6 performs the various tasks discussed.

Referring still to FIG. 1, finance system 4 preferably includes a rule system 40 that implements at least one set of rules pertaining to inquiry of option and/or share status and execution of trades made pursuant to employee stock plans, as well as to automatic processing of a transaction, e.g., with trading system 12, pursuant to at least one employee stock plan.

Broadly stated, these rules provide the logic instructions which direct finance system 4 to allow a participant 10 to review current stock prices; review options and/or shares available to exercise and/or sell; review and accept restricted stock grants and stock option grants; request account statements; exercise options and/or sell single or multiple shares; change or cancel limit orders; review options and/or shares that have been exercised and/or sold in the current or past year; make elections (within parameters defined by the company) for upcoming stock plan events, and perform other general system functions (i.e., change federal withholding taxes, change bank wire routing, and the like). Thus, finance system 4 serves as the central processing unit for processing rights attendant to the employee stock plans. The rules pertaining to inquiry of option and/or stock status and the execution of trades made pursuant to stock plans process the information present in finance system 4 when the processing request is made. Thus, finance system 4 does not require real time access to nonresident, nonvolatile database 22 of administration system 6 to enable option exercise and/or share sale transactions. In this way, finance system 4 of the present invention significantly differs from the prior art and in particular, U.S. Pat. No. 5,671,363.

Finance system 4 preferably also comprises an interface system 38, discussed further below, for interacting with the participant 10 regarding a requested transaction. Finance system 4 may also include a checks and journaling system 42, a confirmation system 44, a modeling function 46, and a web reporting function 47, as will be described below.

The checks and journaling system 42 (discussed also further below) is for tracking and moving proceeds and shares as a result of settlement of executed trades. The proceeds of settled transactions are transmitted to participant 10 via check, bank wire (U.S. and foreign), payment to an employer payroll system, transfer to the participant limited brokerage account, or transfer of proceeds to a full-service brokerage account outside of (external to) finance system 4.

The confirmation system 44 provides a confirmation of any trades made pursuant to employee stock plans after the trade is executed. When a participant 10 submits a trade for execution, a confirmation number is provided. For restricted stock, a trade/transaction is triggered by the passage of time (vest date), not by a participant's submission. Once the trade is executed, finance system 4 forwards a confirmation of the executed trade to administration system 6, i.e., client. In addition, after the trade settles, usually 3-5 business days later, participant 10 receives a confirmation statement and the transaction proceeds, if any, via U.S. Mail. In addition, where participant 10 has interacted with finance system 4 at other times during a particular quarter of the year, the confirmation statement will preferably set forth all executed trades which occurred during that quarter. Most preferably, where transactions have been conducted in connection with a limited brokerage account during a given quarterly period, finance system 4 will automatically generate a quarterly report of all activity transacted during that quarter. This may be provided by the mainframe computer that is internal to the finance system.

The modeling function 46 allows participant 10 to perform calculations to ascertain the effect of various scenarios on option and/or share value. For example, participant 10 can ascertain a current stock price and obtain an estimate of gains and withholding taxes. Moreover, participant 10 can perform "what if" calculations including changes in stock price, taxes, rate of stock price growth and time (affecting vesting and expiration of stock options).

Other subsystems such as a monitoring system 48 of interface system 38, may also be incorporated as will also be described below.

Figure 2:
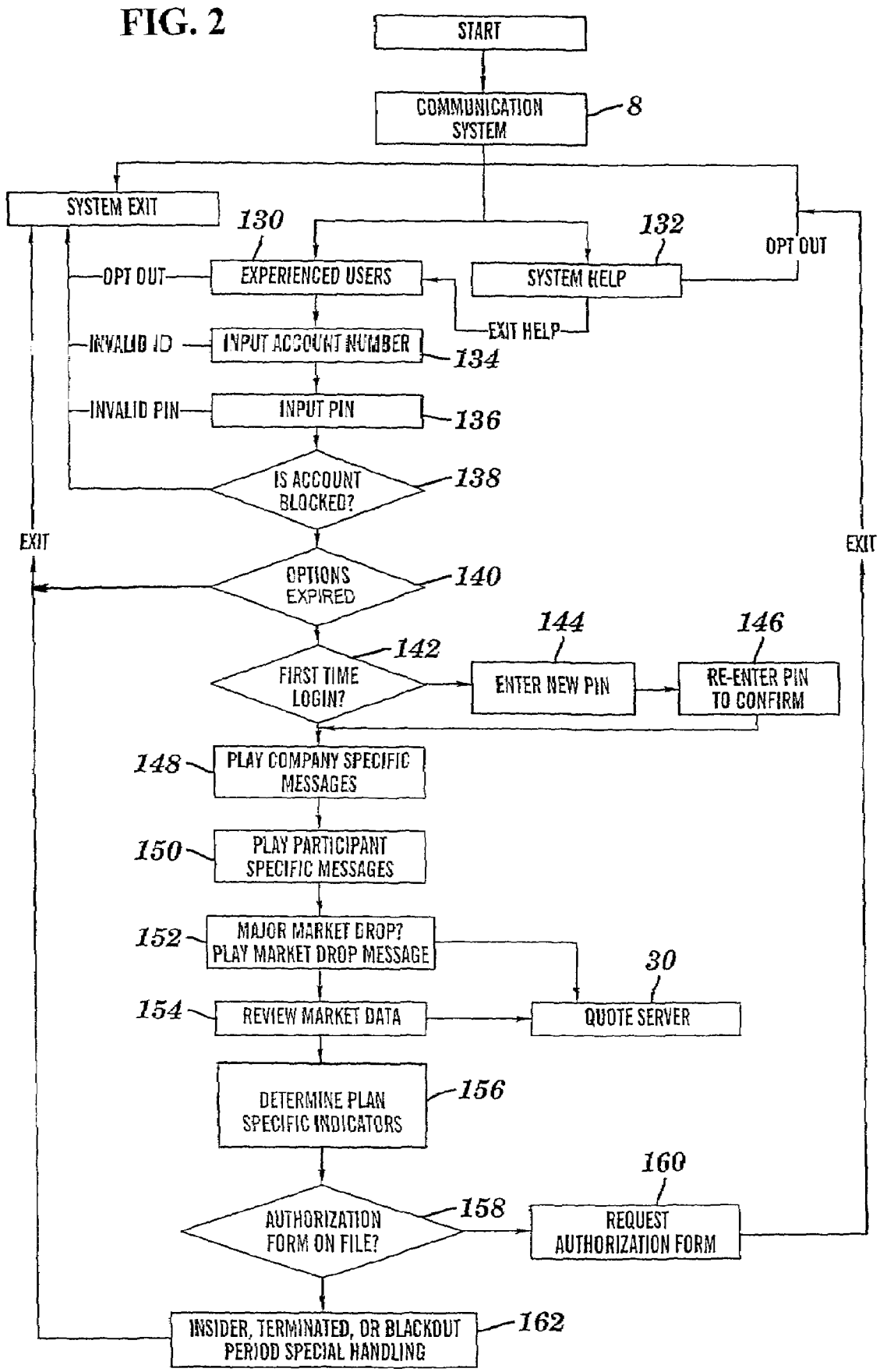
FIG. 2 is a flow diagram depicting system logic for participant access into the system.

Turning now to FIG. 2, the system logic for a first preferred embodiment of participant 10 accessing finance system 4 of the present invention is shown. Communication system 8 provides the means for a participant 10 to access finance system 4, and interface system 38 provides a means to interact with finance system 4, i.e., to provide instructions to system 4 and to view system responses. It should be recognized that interface system 38 may take a variety of forms, e.g., an Interactive Voice Response (IVR) system (such as a telephone-driven interface), web-based access via, for example, the Internet and web pages, cellular telephone and personal digital assistant (PDA) access, and the like. The following description generally describes interface system 38 in terms of a first preferred embodiment of an IVR, but also uses displays of a second preferred embodiment of a web-based interface system 38 where helpful to understand system logic.

Interface system 38 logic starts during a login process, where a participant accesses communication system 8. For example, as mentioned, the participant may access the finance system 4 by telephoning an IVR system, or by entering a specified Universal Resource Locator (URL) into an Internet browser on a personal computer (PC). After telephoning the IVR, logic allows a participant 10 to proceed as an experienced user 130 or to obtain system help 132, for example, by providing participant 10 choices selectable over the telephone. As is known in the art, system help 132 contains instructions on navigation and use of the system. After navigating system help 132, a participant 10 is permitted to opt out of the system or choose to proceed as for experienced users.

When the participant 10 proceeds in finance system 4 as an experienced user, logic prompts for the input of an account number/user ID 134 and Personal Identification Number (PIN) 136 to ensure secure access to the system. FIG. 3 illustrates a participant enrollment logon page of a web-based interface that allows a participant to enter an ID and a PIN.

User IDs may be prearranged between the participant and employer prior. This may occur, e.g., when the participant signs up for the stock plan and the correlative information is entered into administration system 6. PINs may be issued to the employees by the financial services organization. The present invention automates the PIN request process and therefore avoids the need for manual processing of these requests. Both the IVR and computerized communication means support requests for immediate change to a PIN or to request a PIN change form. Receipt of an invalid ID number and/or PIN prompts interface system 38 to request participant 10 to enter a new login number and/or PIN. Receipt of, for example, three (3) invalid ID number/PIN entries automatically exits and locks participant 10 out of the system. In this instance, participant 10 is required to unlock their account by contacting the financial services organization. Or, the participant may be presented with "forgotten PIN" questions. These are pre-arranged between the financial services organization and the participant at the first successful login. If the participant answers the questions correctly, he or she is allowed to access the system, but is forced to change his or her PIN. Assuming the participant's ID number and PIN are successfully validated, system logic determines whether the participant's 10 account is blocked in any manner 138 (FIG. 2), in which case the logic causes the participant to automatically exit finance the system 4. An account may be blocked, for instance, for a low balance. At block 140, it is determined whether the participant's options have expired. If so, the participant is exited from the system, and may be provided with an appropriate message. If the options have not expired, interface system 38 determines whether participant 10 is logging into the system for the first time 142. If so, participant 10 is prompted to enter a new PIN 144 and reconfirm the new PIN 146. Finance system 4 thereafter updates volatile data storage 32 to reflect these changes.

In one embodiment, an optional validation process may be provided as a security measure. In this instance, the system initially requires the participant to provide additional information (i.e., choice of specific questions to answer, corporate and secondary e-mail addresses) which is stored in the system. Thereafter, validation against new entries (i.e., questions and answers) may be performed by comparing validation data, (i.e., the participant's previously stored question selection and answers). Interface system 38 logic correlates the participant with his or her employer. For instance, the IVR or web-based display may present the company name and/or motto during access.

With a web-based interface system, each display (e.g., login page of FIG. 3) of interface system 38 may include an employer name and logo. Here, "XYZ Incorporated" represents the client company/employer, and "UBS PaineWebber" represents the financial services organization. Interface system 38 may present participant 10 with employer-specific messages 148 and participant-specific messages 150, as well as information pertaining to the employers' policies and procedures and/or specifics of the particular plan. Messages may be displayed to allow the user to enroll in the company's stock plan, or request a new PIN.

In a preferred embodiment, the finance system 4 protects participants 10 from conducting transactions during periods of market instability by having interface system 38 query the quote server 30, after a successful login, to determine whether a real time major market adjustment 152 has occurred; for example, when the market has fallen 10, 20, 30% or more. In such a case, a warning is presented to participant 10 over the telephone or, as shown in FIG. 4 for a web-based system, logic directs interface system 38 to display an appropriate message 163.

The display of FIG. 4 also provides participant-related personal information, such as phone numbers, addresses and the like, and whether on-line forms have been completed. Links may be provided to allow the participant to provide updated information, and to access online forms, discussed further below in connection with FIG. 26.

System logic also allows participant 10 to query quote server 30 for current market data 154 (FIG. 2), e.g., current stock price information, including high and low, bid price, volume high and low, bid (Dow Jones), stock net change, net change (Dow Jones). This capability is provided during market hours on a real-time basis. Preferably, and depending upon the specifics of the employer's plan, system logic may trigger access of monitoring system 48, which monitors quote server 30 if finance system 4 does not receive a quote from quote server 30 within a given time period, e.g., 5 minutes. This feature ensures that inaccurate quotes are not transmitted to the participant 10. Preferably, monitoring system 48 notifies a system monitor and/or paging service if quote server 30 fails to provide a quote within a given amount of time.

System logic determines, at login, plan-specific indicators 156, e.g., whether participant 10 is participating in a stock option plan, stock purchase plan, restricted stock plan, or any combination thereof. In most instances, participant information in volatile data storage 32 will indicate the participant's 10 plan(s). For a web-based system, this confirmation is made, for example, by checking the volatile data storage database 32. Alternatively, records such as cookies may be placed on the participant's computer system (e.g., PC or workstation), and confirmation can be made by examining the records and reviewing them during login. Logic also determines whether the individual participant has previously executed an authorization form 158. If not, interface system 38 provides the participant 10 the option to request an authorization form 160, e.g., by providing telephone touch key selections or, as shown in FIG. 5 for a web-based system, presenting selectable hypertext links on a display that allow the participant to complete and submit the form online, and capture an online signature. FIG. 5 is a display of a web-based interface system illustrating an authorization form request window. Here, the various authorization forms are listed, such as international and domestic account authorization forms. These forms enable a participant to authorize a financial services organization to transact trades on the participant's behalf. The forms may be provided in any desired format, such as Microsoft Word, Abode, or HTML. The participant may click on a hyperlink associated with each for access the form and/or instructions for filling out the form. In another embodiment, a submenu of forms in a given category may be displayed for selection by the participant. Instructions may also be provided to assist the participant in selecting the appropriate form.

Once requested, the authorization form may be delivered to the participant, e.g., via fax, mail or by e-mail, where appropriate safeguards are built into finance system 4. When participant 10 has not provided an authorization form, interface system 38 may direct the participant to complete an appropriate on-line form that is editable by the user via his or her Internet browser. When an IVR is used, the participant may be given instructions to obtain the appropriate forms. If logic produces an affirmative response to the query for an authorization form, interface system 38 also determines whether additional conditions exist 162 (FIG. 2) which would prevent use of finance system 4, such as whether the participant 10 is an insider or subject to a blackout period. Participants that have been terminated from the company may or may not be restricted from trading with the finance system. If the participant is restricted from trading, logic automatically transfers the participant 10 to a broker or instructs the participant to call the broker for assistance.

Figure 6:
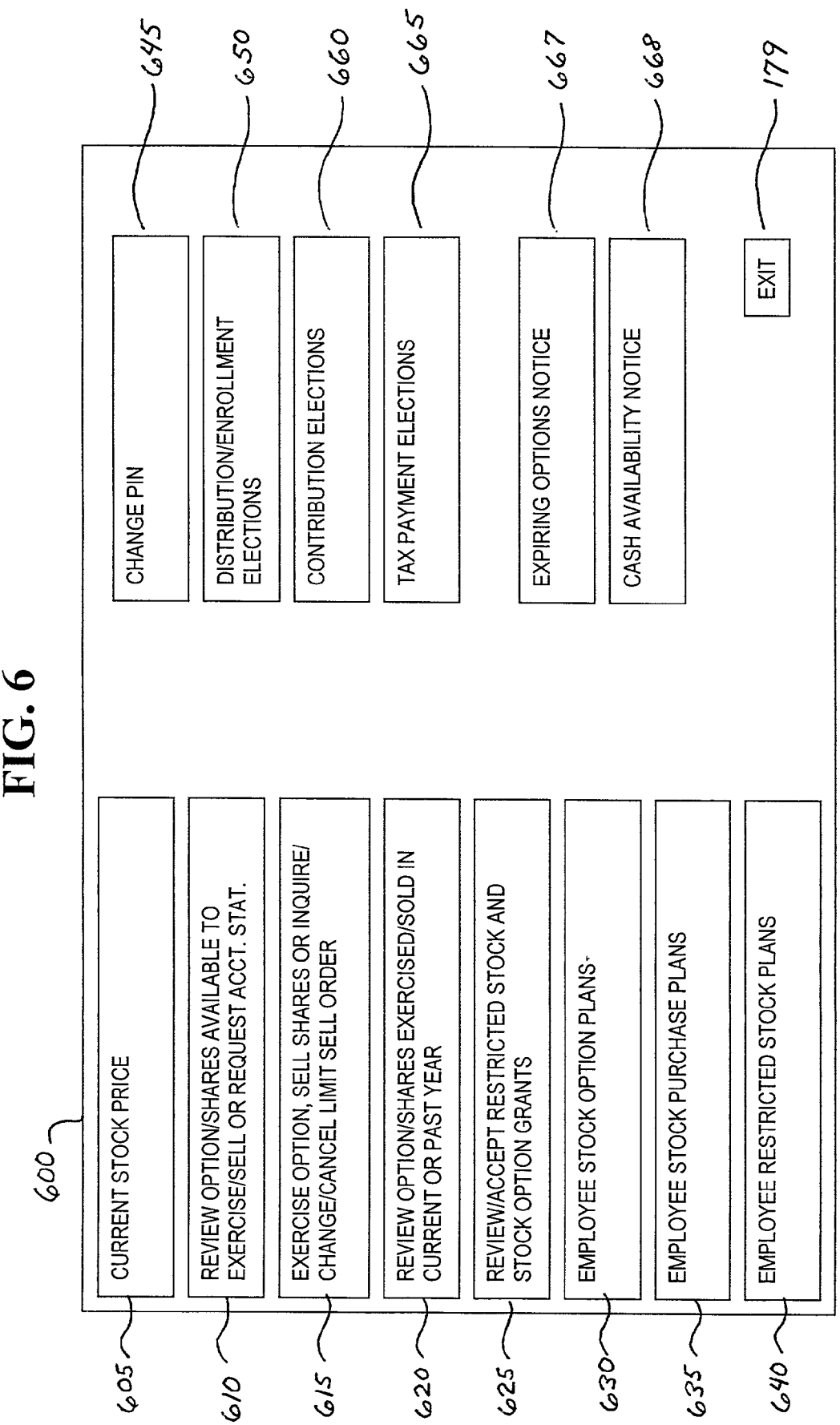
FIG. 6 is a display of a web-based interface system illustrating process selections.

Once successful login has been attained, and it has been determined that the necessary authorization forms are on file, participant 10 is presented with a main menu 600 of selections, shown for a web-based system in FIG. 6, that provide for further interaction with finance system 4. While main menu 600 has been shown in terms of the second preferred embodiment of a web-based interface system 38, it should be recognized that, relative to the first preferred embodiment of an IVR system, the selections illustrated may be read to the participant via the telephone to enable the participant to make the desired selection, e.g., by pressing keys on the telephone's key pad, or by speaking into the phone, in which case known voice recognition techniques may be used.

Generally stated, interface system 38 permits participants 10 to exercise stock options, accept grants of restricted stock, elect to receive proceeds as stock certificates or by transferring shares, sell a portion or all shares of stock already acquired, or hold stock in a limited brokerage account operated, e.g., by the financial services organization. Participant 10 is presented with different selections depending on plan entitlements. That is, only those shares or options that have been actually acquired pursuant to an employee stock plan are available for processing by finance system 4. Further, only those selections which have vested for a given participant 10, as determined by administration system 6, are forwarded to finance system 4 pursuant to the data transfer there between. The exemplary selections shown provide a full palette or menu of selections, i.e., participant 10 presented with these selections participates in or has interests in a stock option plan, stock purchase plan, and restricted stock plan. For example, if only a stock purchase plan was available to a participant, stock option and restricted stock plan selection would not be made available. Thus, the menu is populated with selections and other information based on plan identification information that is associated with each participant. The plan identification information may include any type of identification or coding scheme that relates the participants to specific plans or plan features. Moreover, if all participants of a given employer have the same stock plan or plans, the menu may be populated based on plan identification information that is associated with the employer.

As shown in FIG. 6, the interface allows participant 10 to select between querying current stock price information 605 via quote server 30, discussed previously; review options/shares available to exercise/sell or request account statement 610; exercise options, and sell shares or inquire/change/cancel limit orders 615. Regarding selection 620, finance system 4 maintains sufficient records of prior transactions (e.g., for one or more years), which enables participant 10 to review options and/or shares that have been exercised and/or sold in the past. In this instance, the applicable records are stored in nonvolatile database 22 of administration system 6 and transmitted to volatile data storage 32 of finance system 4 pursuant to data transmission(s), or they may have been entered in via the interface of FIG. 4, and uploaded by import/export using non-volatile database 22. This avoids the need for real time access between the finance system 4 and the administration system 6. Participant 10 can access this information via any available means, as for example, by IVR system, the Internet or a written record (such as a screen printout) obtained from the financial services organization.

The interface further allows the participant to review and accept restricted stock and stock option grants 625; access information about employee stock options plans 630, stock purchase plans 635, and restricted stock plans 640; or exit 179 the finance system 4. With regard to selections with multiple sub-selections, e.g., selection 610, interface system 38 presents sub-menus for selection as known in the art. In addition, selections may be provided to allow the participant to change his or her PIN 645, make distribution/enrollment elections 650, such as changing the source or recipient of settlement proceeds (e.g., change bank wire routing), make contribution elections 660 (e.g., change from employee payroll deduction to automatic debit from a particular participant account or the like), and make tax payment elections 665 (e.g., revise federal tax withholdings of settlement proceeds, or designate how taxes are to be paid). The main menu may also include notices relating to expiring options 667 and cash availability 668.

Figure 7A:
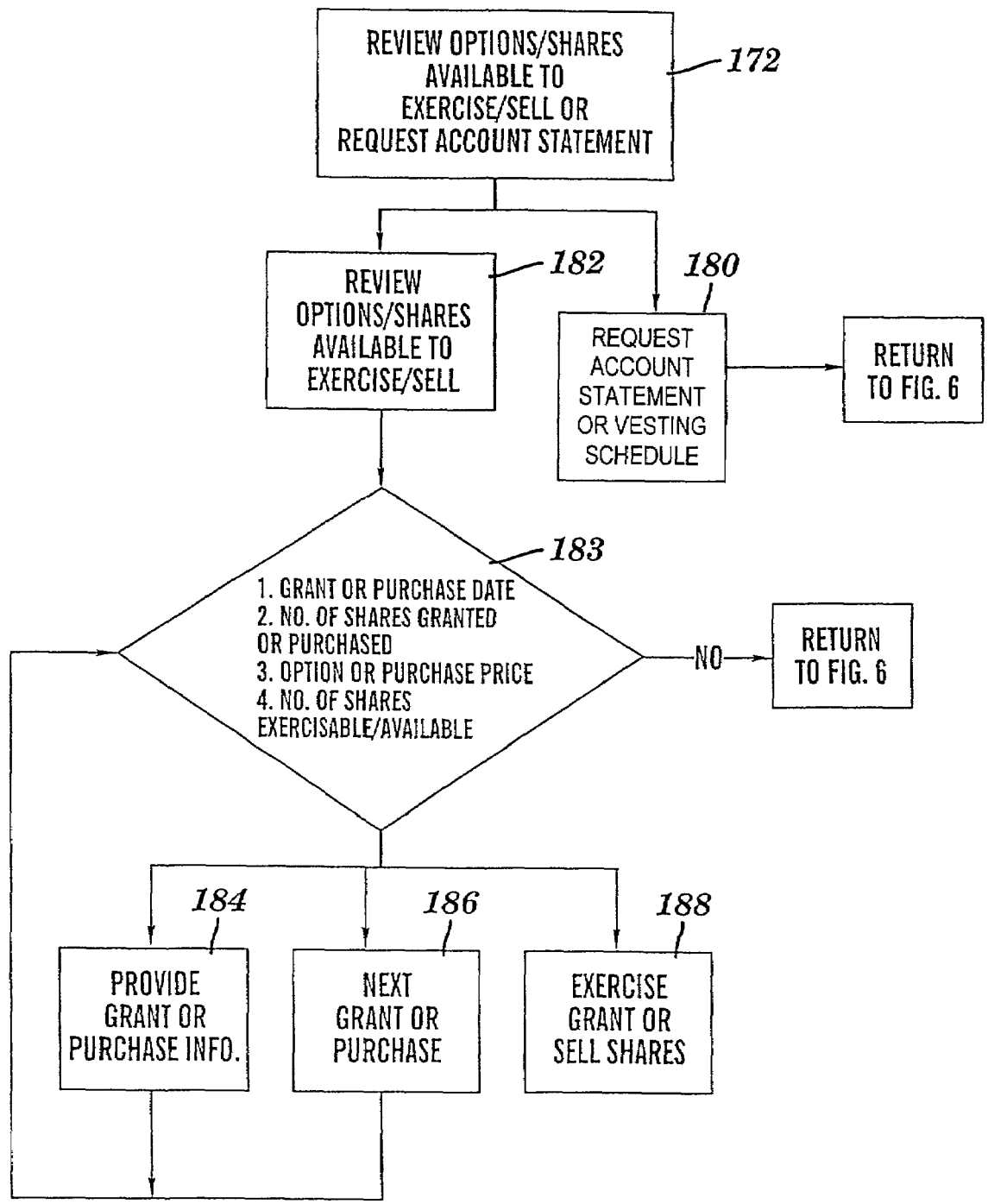
FIG. 7A is a flow diagram depicting system logic to review available options and/or shares.

FIG. 7A illustrates system 38 logic where participant 10 chooses review options/shares available to exercise/sell, or request account statement selection 610 of the main menu 600 of FIG. 6. Discussing first a participant 10 request for an account statement or a vesting schedule 180, logic branches to a delivery option (not shown) (i.e., fax, mail, or email) and then returns participant 10 to the main menu 600.

As shown in FIG. 7A, with respect to selection of reviewing options and/or shares available to exercise and/or sell 182, logic 183 determines: (1) grant or purchase date; (2) number of shares granted or purchased; (3) option or purchase price; (4) number of shares available for exercise and/or sale. Where a negative response is provided by finance system 4, i.e., no options are available to exercise or shares available to sell, interface system 38 returns participant 10 to main menu 600. A positive response causes logic to branch to provide specific grant or purchase information 184 for a first group of options and/or shares; provide grant or purchase information for other available options and/or shares 186 (not shown in FIG. 7B); or provide the ability to exercise options or sell shares 188. These same selections are available for other groupings of options and/or shares held by the participant.

Referring to FIG. 7B for a web-based system display 185, a participant statement illustrates information 184 regarding grants for a first group of options. The participant may select an exercise grant selection 187. After the option grants have been exercised and corresponding shares have been acquired, or the shares have previously been acquired and are available to sell, the participant is provided with a "sell shares" selection to sell the shares. Preferably the sell shares selection is on a different web page than the exercise grant selection 187 in order to separate the actions of exercising grants and selling shares. For ESOPs, the exercise grant selection may be provided via a tab at the top of the display. When the participant clicks on the tab, a new menu is displayed. For ESPPs, an order entry (sell shares) selection may also be provided via a tab at the top of the display.

The selections shown in FIG. 7B are audibly provided where an IVR interface system 38 is used.

FIG. 7C illustrates a web-based system display that enables a participant to review or accept grants such as restricted stock grants. This display is provided after the participant logs in or selects option 625 of the main menu page 600 in FIG. 6. A restricted stock home page is also provided which includes summary information for an employee's restricted stock awards, as well as open orders and a 30-day (company customizable) order history.

Generally, system logic of the finance system 4 may provide various types of RSA plans that can be accessed by the participant employees via the Internet or an IVR system. In particular, the RSA plan may be accessed via the Internet to allow participants to accept grants, make tax payment elections (as taxes are due upon vesting/restriction lapse for restricted stock), review grant information, view election and tax history, sell shares (post vesting) acquired resultant from restricted stock grants, and obtain combined employee stock plan statements.

For example, web-based display 700 includes a display 710 of restricted stock grant information, such as grant number (an internal control identifier), grant date, number of shares granted, grant prices, number of vested and unvested shares, number of canceled shares, and shares available for sale. Display 730 provides detailed vested share information, illustrated here, for example, as two groups of 625 shares from one grant with multiple vest dates. The share disposition is detailed here. A hyperlink may be provided to allow the participant to view a confirmation report. An unvested shares display portion 750 provides detailed unvested share information. Here, four different groups of unvested shares, as illustrated, each having 625 shares that vest on different dates.

The RSA plan may be accessed by authorized internal employees of the financial services organization, such as CSR's and financial advisors, via an Intranet interface to view participant information, enter receipt of payment, edit information, and make elections/enter trades on behalf of an employee and/or company. In such instances, the Intranet interface would be based on the Internet interfaces but modified to provide features used by the CSR's and financial advisors. Preferably, system logic would also enable employees of the financial services organization to set up a company and make future plan changes.

An IVR component of the RSA plan provides access for participants to review grant information, view election and tax history, sell shares (post vesting) resulting from restricted stock option grants, and obtain employee stock plan combined statements.

Specifically, the RSA plan includes award creation and award acceptance components. New awards are created outside the administration system 6 and hereafter imported into system 6. It is necessary to track whether shares are 'issued at time of award', or 'issued at time of vesting.' For shares issued at time of award, it is necessary to track where the issued shares are held, which may be either at the company, at a transfer agent or at the financial services organization. Finally, it is required to store the country of awardee residence at the time of the grant.

The RSA plan allows an awardee to accept an award of restricted stock directly via the Internet, or via an employee of the financial services organization who uses an intranet of the organization. These awards are accepted in a manner analogous to the acceptance of stock option awards.

For the Internet approach, as soon as an awardee/participant logs onto the Internet, the awardee is prompted with a summary of the awards pending acceptance. If the awardee continues, an Award Acceptance Agreement Document is displayed based on a grant code identifier provided at award creation. In addition to the grant agreement, the awardee is presented with facilities to accept or reject the award or defer the decision until a later point in time. If the awardee chooses to defer the decision, no action is taken and the award remains 'pending acceptance.'

If the awardee chooses to accept or reject the award, the awardee is presented with a confirmation screen. The awardee may print the confirmation screen and award information. In addition, the awardee may enter an email address to which an emailed copy of election choice and grant agreement are sent.

For the Intranet approach, the authorized internal employee can change the status of the award acceptance, e.g., based on a telephonic request from the company. This includes the ability to accept an award that was previously rejected either explicitly or by invocation of the backup method by company instruction. Entitlements may be used so that only the appropriate individuals can change the status of award acceptance.

Additionally, the invention may provide appropriate web pages and system logic to enable an awardee to may make various online elections in the pre-vesting phase, such as 83b elections, making an award cost/tax payment, and electing share delivery and proceeds payment methods.

An 83b election gives the awardee an opportunity to pay taxes on or about the time of the award instead of at each vesting cycle. Elections must be made within 30 days of the award date and are irrevocable, but can be changed via the Intranet by an administrator if the company authorizes an exception. The filing of 83b elections must be made through the company, so the company must send an importable file to the financial system 4 to identify those awardees who have made 83b elections and the associated grants.

The tax payment methods that can be elected by the awardee may include withhold shares, sell to cover, sell all, cash, and payroll deduction. Moreover, the client company may set up various tax payment choices for each awardee class, including choice of backup method for blackout period, choice of backup method for cash (sell to cover or do nothing, where company collects cash payment), backup methods for insider awardee class, and whether Section 16 insiders can elect withhold as a tax payment method. Moreover, the awardees may be classified into different categories of insiders.

The share delivery method choices that can be elected by the awardee, which are leave in account, certificate, electronic share transfer, and sell remaining, provide means by which the stock proceeds from a vesting are distributed to the awardee. For each awardee level, the company chooses which (one or more) of the choice will be available to awardees (for all plans) at the time of election, and which one should appear as the default. The proceeds payment methods include distribution to the awardee via company payroll, leave in account, check, and wire transfer (including transfer to domestic or foreign accounts).

The invention further enables running of reports for the restricted stock plans for administration purposes and to provide information to the client, awardees, and administrators to facilitate the flow of information and the reconciliation process. In particular, at the pre-vesting phase, reports may be provided for: shares vesting, shares vesting summary, awardees without accounts with the financial services organization, canceled shares recap report, 83b elections, and 83b terminations.

The RSA plan may further use a block trade and block allocation process to facilitate trading as discussed further below.

Figure 8:
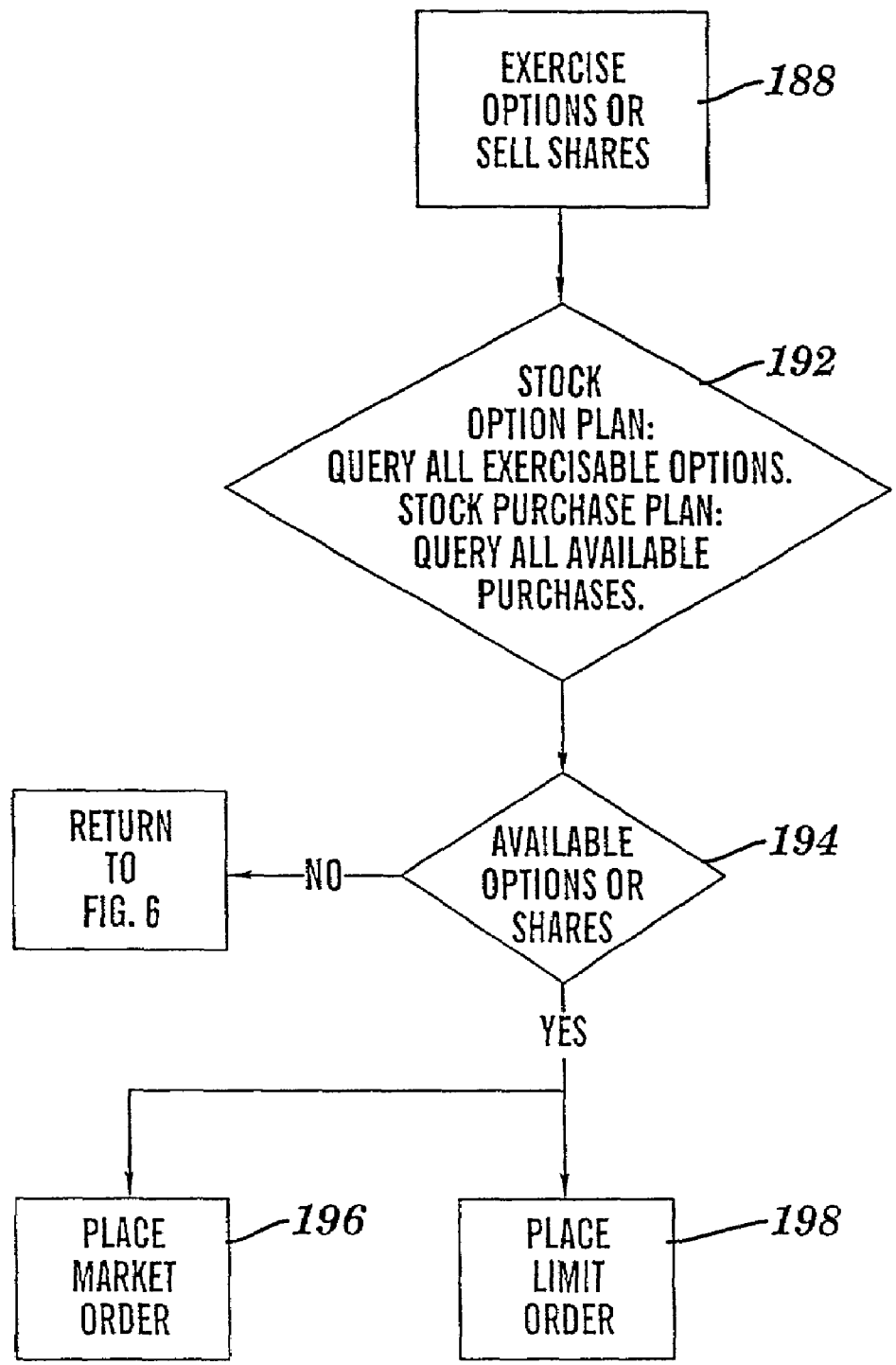
FIG. 8 is a flow diagram depicting system logic that enables a participant to place orders for execution on the exchange.

FIG. 8 illustrates interface system 38 logic for the exercise of option grants, or the sale of shares. This sale of shares applies to ESPPs and post-vest RSA plans. Where participant 10 chooses to sell shares, system logic queries all saleable shares 192. This query also takes into account any shares pending execution. Similarly, for the exercise of options, system logic queries all exercisable options, taking into account underwater grants and any options pending execution 192. "Underwater" options exist where the sale price is below the option price. Moreover, the system accommodates both market and limit orders. A "market order" is an order to buy or sell a security at the best available price, and a "limit order" is an order to buy or sell a security at a specific price or better. When an affirmative response 194 is detected (e.g., sale price above option price), the system accepts the order (market 196 or limit 198) for further processing in preparation for the trade. Conversely, when the sale price is equal to or less than the option price, system logic freezes entry and further processing of the order. Thus, system logic prevents entry of orders to exercise options where the limit price is less than or equal to the strike price. Accordingly, the system refuses to accept "underwater" limit orders. Therefore, a participant order causes system logic to compare the sale price to the option price. If it is determined at 194 that no options and/or saleable shares are available, participant 10 is returned to main menu 600, shown in FIG. 6.

As noted above, transactions can be executed via cash or other non-cash means, such as by cashless, stock swap, or by selling sufficient shares to cover associated transaction costs, wherein participant 10 uses an NASD-licensed individual to execute trades via an Intranet. Where communication system 8 is a telephonic system or the Internet, transactions are executed on a non-cash basis.

Figure 9:
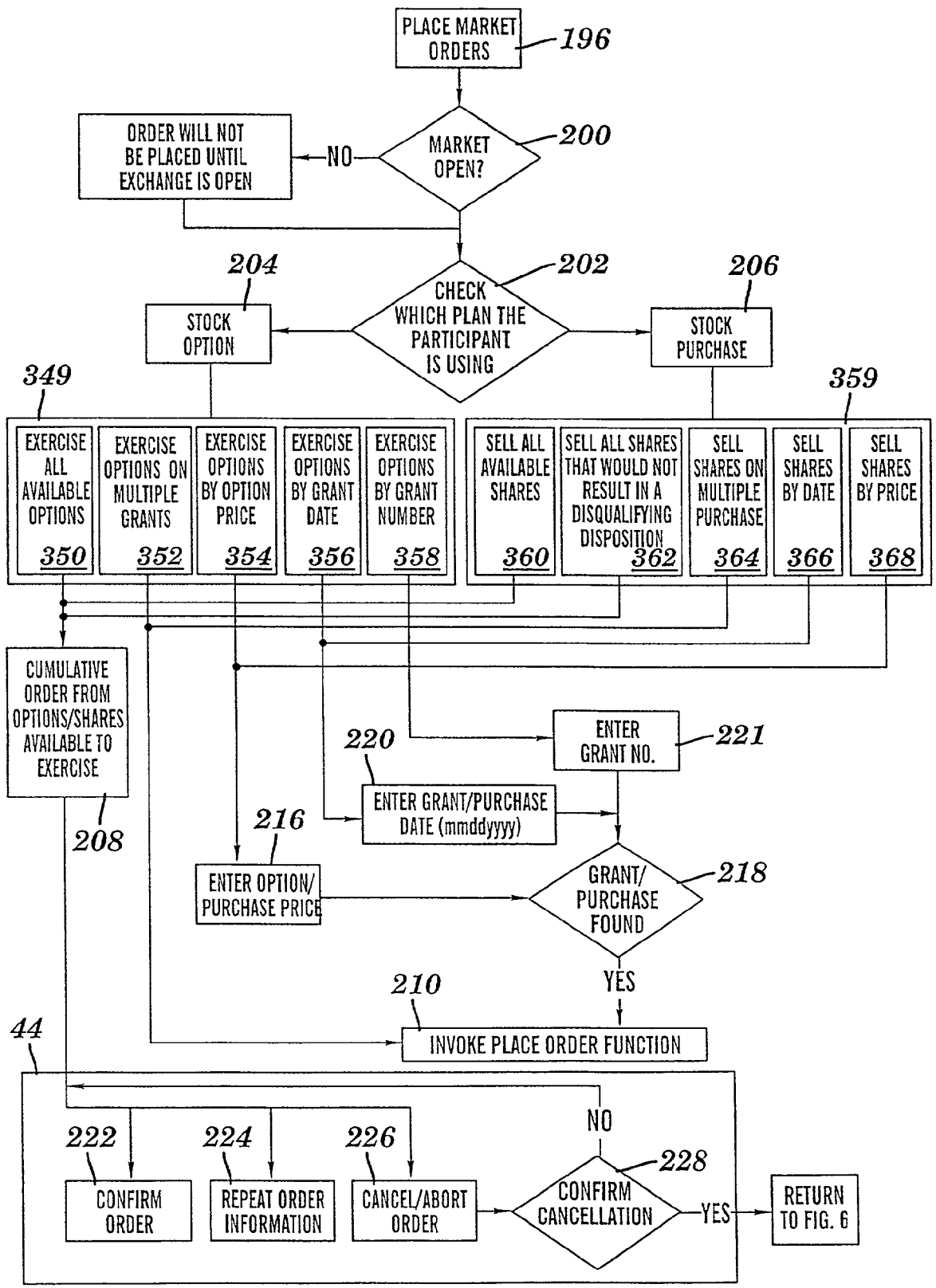
FIG. 9 is a flow diagram depicting system logic for the placement of market orders.

A market order 196 placed in accordance with the present invention proceeds as illustrated in FIG. 9. Assuming a cashless transaction, logic checks an internal clock 200 to determine whether an exchange 28 is open, e.g., based on day of week, holiday, and time of day. Where exchange 28 is closed, the order proceeds as described below and is held in trading system 12 until exchange 28 opens. When exchange 28 is open, logic determines which type of transaction (i.e., option exercise and/or stock sale) is sought 202, i.e., which plan participant 10 is using, and branches to the appropriate block 204, 206, with a subsequent market order forwarded to the exchange on an essentially "real-time" basis, as that term is known in the art.

Option exercise block 204 allows participant 10 to select from options exercise menu 349, exercise all available options 350, exercise options on multiple grants 352, exercise options by option price 354, exercise options by grant date 356 or exercise options by grant number 358. The grant number is a reference number assigned to each option grant. See table 184 in FIG. 7B. Likewise, stock sale block 206 allows participant 10 to select from a stock sale menu 359 to sell all available shares 360, 362, sell shares on multiple purchases 364, and sell shares by purchase/vest date 366 or by purchase/vest price/fair market value (FMV) 368. Based on the offering period start date and purchase date, the user may also be informed that the sale, transfer, or certificate may result in a disqualifying disposition.

The rules permit participant 10 to perform other functions related to option and/or share exercise and/or sales at block 204, 206. These include the ability to change the participant's PIN, change the source or recipient of settlement proceeds (i.e., change bank wire routing—with assistance of a CSR, change from employee payroll deduction to automatic debit from a particular participant account or the like), and revise federal tax withholdings of settlement proceeds. As discussed previously, finance system 4 also allows participants 10 to perform calculations to ascertain the effect of various scenarios on option/share value.

Where participant 10 chooses to exercise all available options 350 or sell all available shares 360 for a given employee stock plan (including all shares that would not disqualify the participant 362) system logic builds a cumulative order 208 for transmission to trading system 12 and exchange 28. After cumulative order 208 is transmitted to trading system 12, interface system 38 logic allows participant 10 to access confirmation system 44 to confirm the order 222, repeat order information 224 or cancel/abort the order 226. If participant 10 cancels an order, interface system 38 queries participant 10 to confirm cancellation 228. Where a negative response is received, interface system 38 recycles participant 10 back to confirm the order 222, repeat order information 224, or cancel/abort the order 226. If a positive response is received to confirm the cancellation 228, interface system 38 cancels the order and forwards participant 10 back to main menu 600, shown in FIG. 6.

After an order has been executed on exchange 28, it is stored in volatile data storage 32 of finance system 4 for transmission to nonvolatile database 22 of administration system 6. The data control system 34 software at the administration system 6 ascribes brokerage fees, option cost, and taxes to be applied to that particular order, and this information is transmitted back to finance system 4 pursuant to the data transfer. Commissions and fees are calculated and applied in the volatile database 32 and sent to the non-volatile database 22 of the administration system. The executed order is then forwarded for settlement and journaling (discussed further below).

Where participant 10 does not exercise all available options 350 or sell all available shares 360, an order is prepared, as described below, and transmitted to trading system 12 and exchange 28.

As further shown in FIG. 9, where participant 10 chooses to exercise options or sell shares by price, he or she enters the option or purchase price 216. For example, at an audible query for a price, e.g., assuming the system logic is carried out in an IVR system, interface system 38 determines 218 that the appropriate option grant and/or shares acquired from a previous purchase exist, and the grant/purchase information is forwarded to the place order function 210. Similar processing logic is used where participant 10 chooses to exercise options or sell shares by grant/purchase/vest date, or grant number. In such instances, the system requires participant 10 to enter the grant or purchase date 220 or grant number 221, (e.g., at a voice query) and the system then determines whether the grant or shares acquired from a previous grant/purchase/vesting exists 218 and forwards the grant/purchase/vesting information to the place order function 210.

Where participant 10 chooses to exercise options or sell shares on multiple grants and/or purchases/vesting 352, 364, system logic forwards this request to the place order function 210, discussed below. As will be described, this feature allows the system to accept orders from a single participant 10 across multiple option grants or share purchases, with these orders immediately sent to trading system 12 and forwarded to exchange 28.

Figure 10:
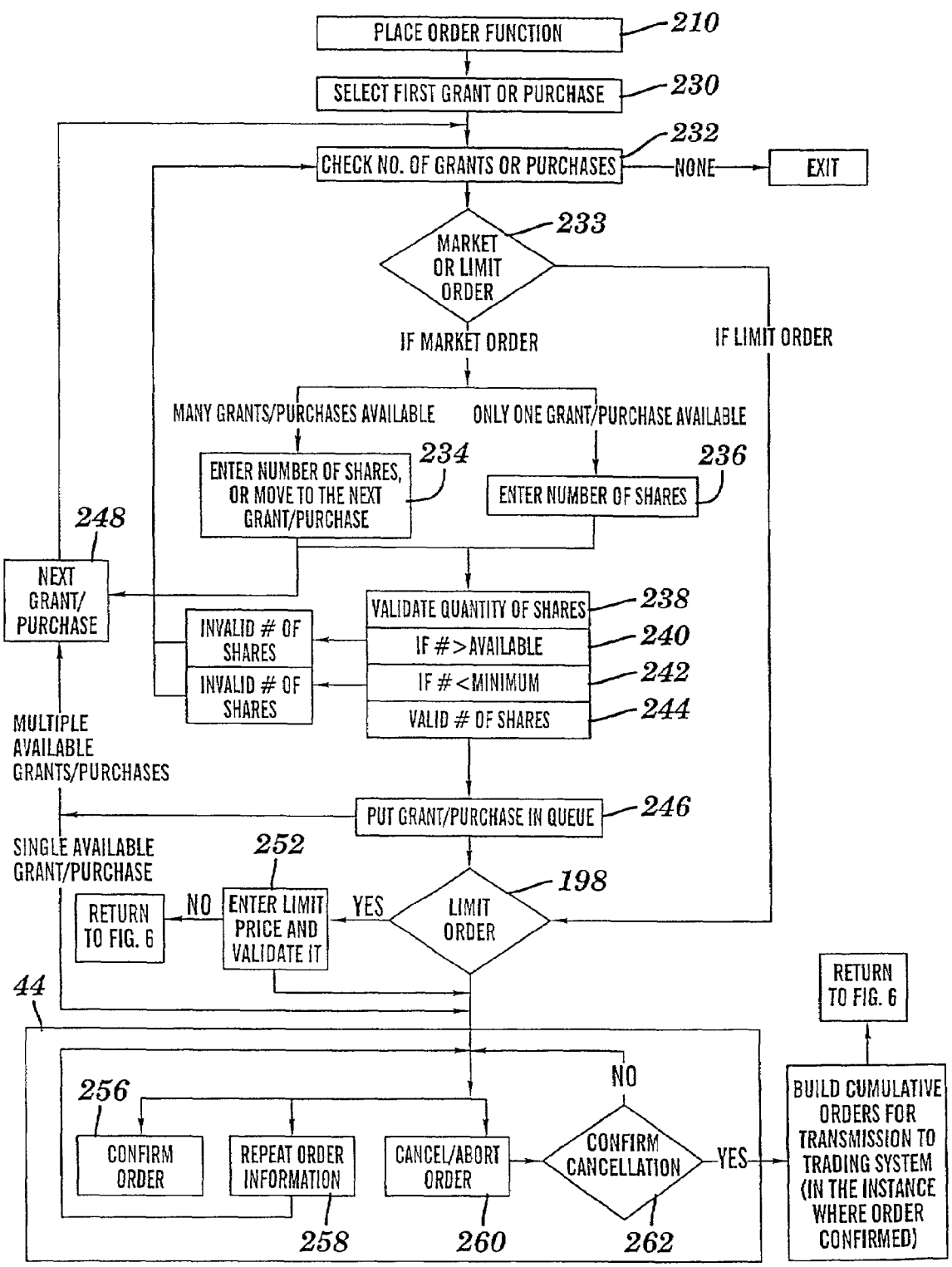
FIG. 10 is a flow diagram depicting a place order functionality available for the execution of multiple options and/or shares.

In FIG. 10, place order function 210 is described in detail. At block 230, logic requires that for each respective group of options and/or purchases/vests, participant 10 choose the first grant or purchase to exercise/sell based on grant/purchase/vest date, total number of options/shares, option and/or purchase price (fair market value for vest) and the number of options/shares available to exercise and/or sell. Next, the number of grants or purchases/vest dates with options/shares available to exercise and/or sell is again compared 232 to participant information stored in volatile data storage 32 of finance system 4. Where logic determines that available grants/purchases/vests are unavailable, system logic automatically exits participant 10 from finance system 4. Alternatively, the transaction is allowed to proceed as described below. In this case, finance system 4 again confirms whether the transaction is a market or limit order 233, as selected by participant 10 (FIG. 8). Where a limit order is detected, logic proceeds to block 198 (discussed below). If a market order is detected, system logic requires participant 10 to choose a number of options and/or shares to exercise and/or sell 234, 236 or to choose another group of grants and/or sellable shares 248 (if that more than one grant/purchase is available). This may be accomplished by selecting an appropriate number of options and/or shares, etc. in response to an IVR query of interface system 38. The number of options and/or shares selected is validated against the number available for exercise or sale 238, 240, 242 and where an invalid response is detected, the process returns to box 232 to review the number of grants or shares acquired from a previous purchase/vesting. Where a valid number of shares is detected and the exercise or sale price has been confirmed 244 (where only one grant/purchase is available), the grant/purchase/vesting is placed in queue 246 where an order to sell the shares for the exercise/share disposition is built and forwarded to trading system 12 and exchange 28. Where multiple grants/purchases are available, logic moves to block 248 to repeat the exercise process for the next group of grants/purchases. That is, logic cycles through again to query participant 10 for further grants/purchases.

Where the transaction is found to be a limit order 233, 198, participant 10 enters and validates the limit price 252. Finance system 4 again confirms this against the limit price previously set (discussed below). If no correlation is found, participant 10 is returned to the main menu 600 shown in FIG. 6. If a correlation is found, interface system 38 activates confirmation system 44 to confirm or cancel the transaction as illustrated in blocks 256-262. Where the order is confirmed, interface system 38 provides a participant order for each employee stock plan transmission to trading system 12 and exchange 28. Alternatively, the interface system 38 may build a cumulative or aggregated participant order for transmission to trading system 12 and exchange 28 which combines orders across multiple employee stock plans for a participant. Advantageously, this embodiment of the finance system 4 allows participants 10 to exercise stock options and sell shares in a single transaction. That is, finance system 4 detects that both option grants and sellable shares are available and forwards the participant back to main menu 600 illustrated in FIG. 6 to allow for exercise of another type of compensation (e.g., to allow options to be exercised, then shares to be sold). Where finance system 4 determines there are no additional exercisable options or sellable shares, the order is forwarded to trading system 12 and exchange 28. Market orders are changeable only when exchange(s) 28 are closed.

Figure 11:
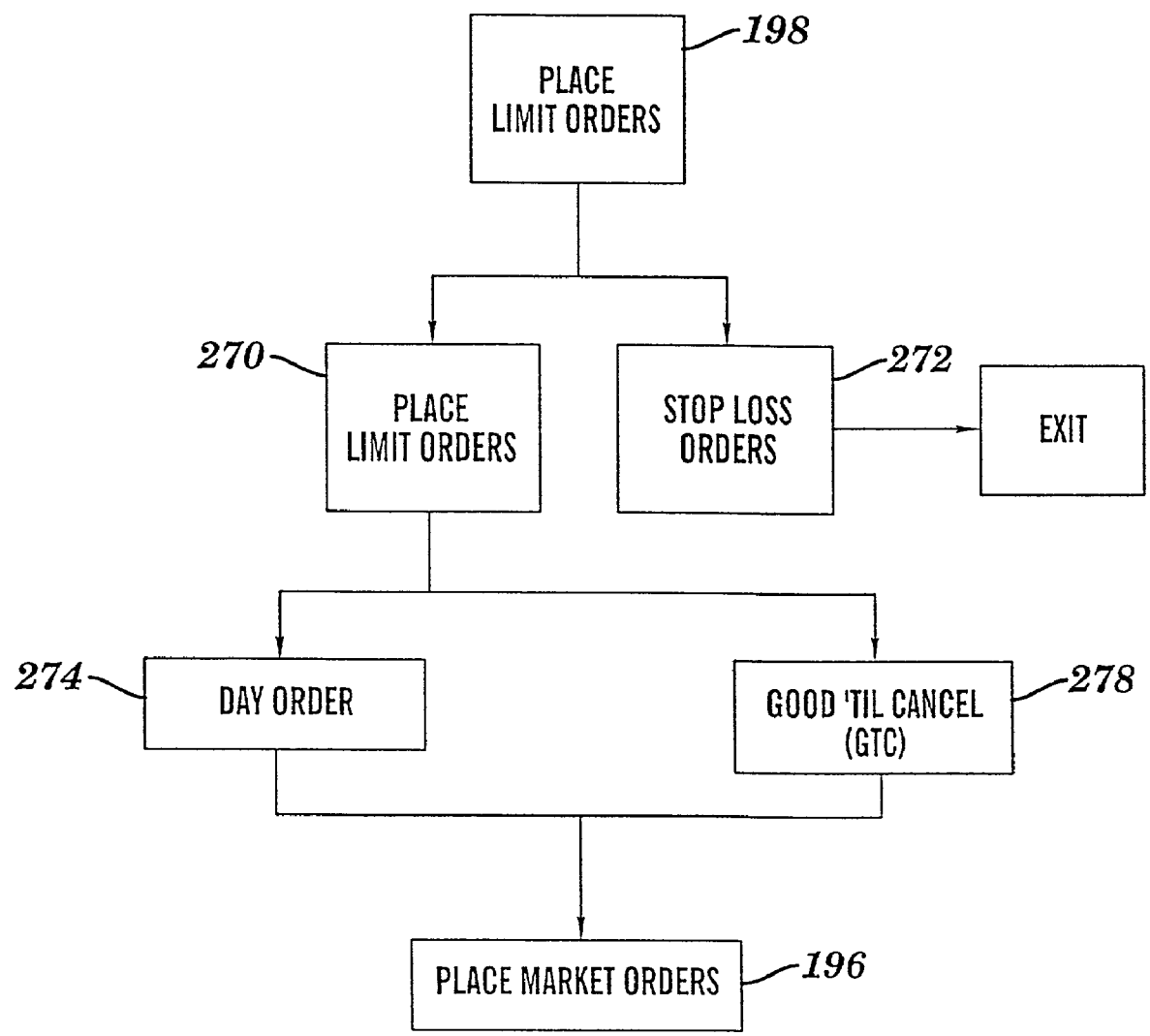
FIG. 11 is a flow diagram depicting system logic for placing a limit order.

FIG. 11 shows system logic for placing a limit order 198. At block 198, interface system 38 allows participant 10 to enter a limit price for exercise or sale, i.e., a predetermined value at which exercise or sale will not occur unless all criteria are met. The finance system 4 will allow the exercise and/or sale to proceed only if the target limit price is greater than the option/share price. As previously discussed, when the sale price is equal to or less than the option/share price, finance system 4 freezes entry and further processing of the order.

Upon selection or determination (i.e., from FIG. 10) of a limit order, as shown in FIG. 11, interface system 30 queries participant 10 as to whether to place a limit order 270 or a stop loss order 272. A "stop loss order" is one in which participant 10 sets a sell price below the current market price to prevent loss if the stock drops. Entry of a stop loss order automatically exits participant 10 from finance system 4, and the participant 10 is preferably transferred to a financial advisor for further guidance. Limit orders that may be placed include good-til-canceled (GTC) orders 276 (at the number of days specified by the company—typically thirty days) and day orders 274. A "day order" is one that expires unless canceled or executed the day it is placed, or the next day if placed after the market closes. Once the type of limit order is selected, system logic proceeds to market order block 196 for placement of market orders in accordance with the pre-selected limits.

As indicated, finance system 4 processes orders on a participant-request basis. Both limit orders and market orders are automatically forwarded to trading system 12 and exchange 28 for execution. For limit orders, the order is not executed unless and until the associated criteria is met.

Figure 12:
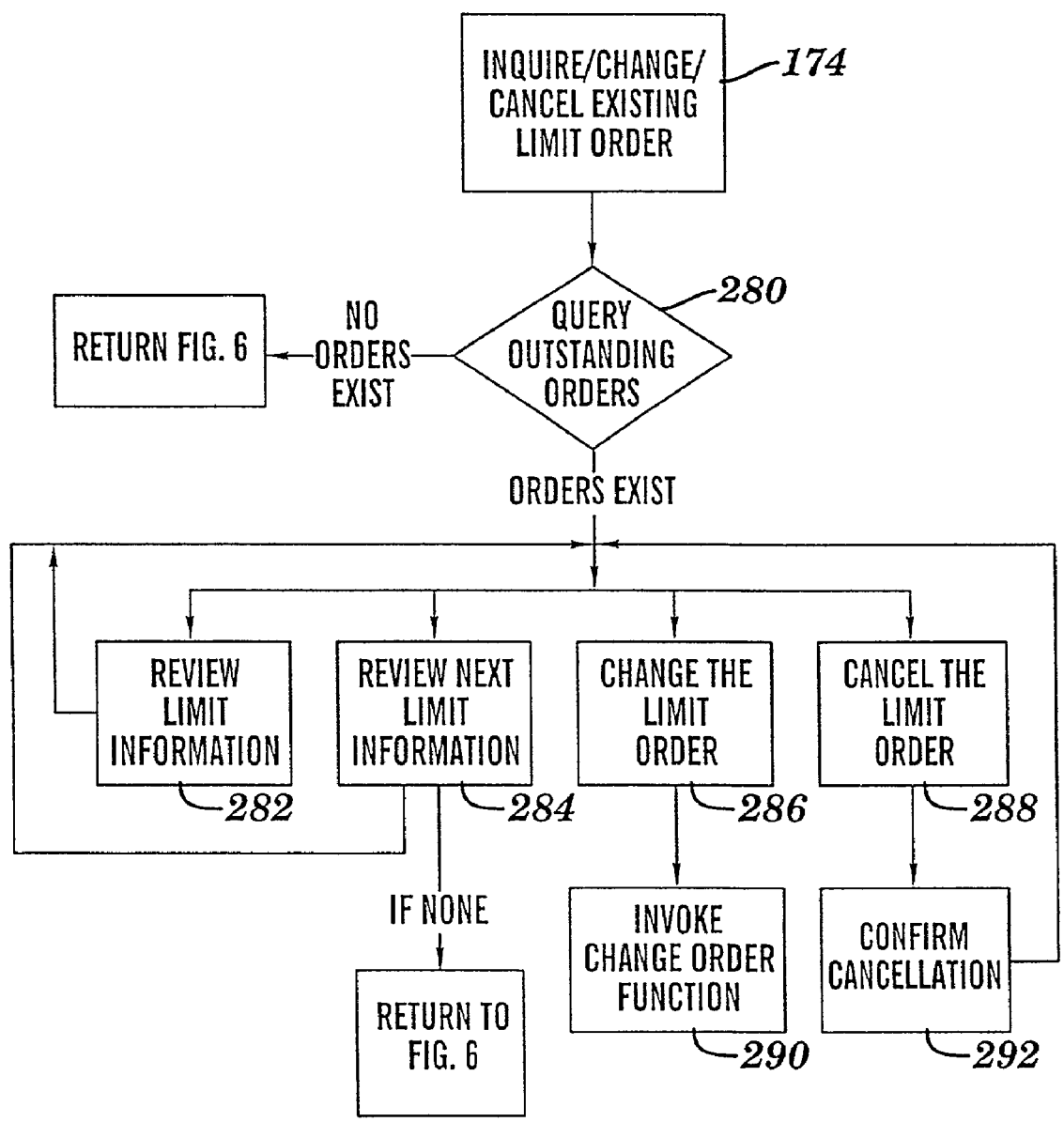
FIG. 12 is a flow diagram depicting system logic for changing a limit order.

Turning to FIG. 12, participant 10 can choose from a submenu of main menu 600 (FIG. 6) to inquire/change/cancel limit orders 615. In this case, finance system 4 logic determines whether outstanding limit orders exist 280 and if so, for each individual order, participant 10 can review limit information for a particular order 282, review limit information for other orders 284 (if available), change the limit order 286 via the change order function 290 (discussed below), or cancel the limit order 288, 292.

Figure 13:
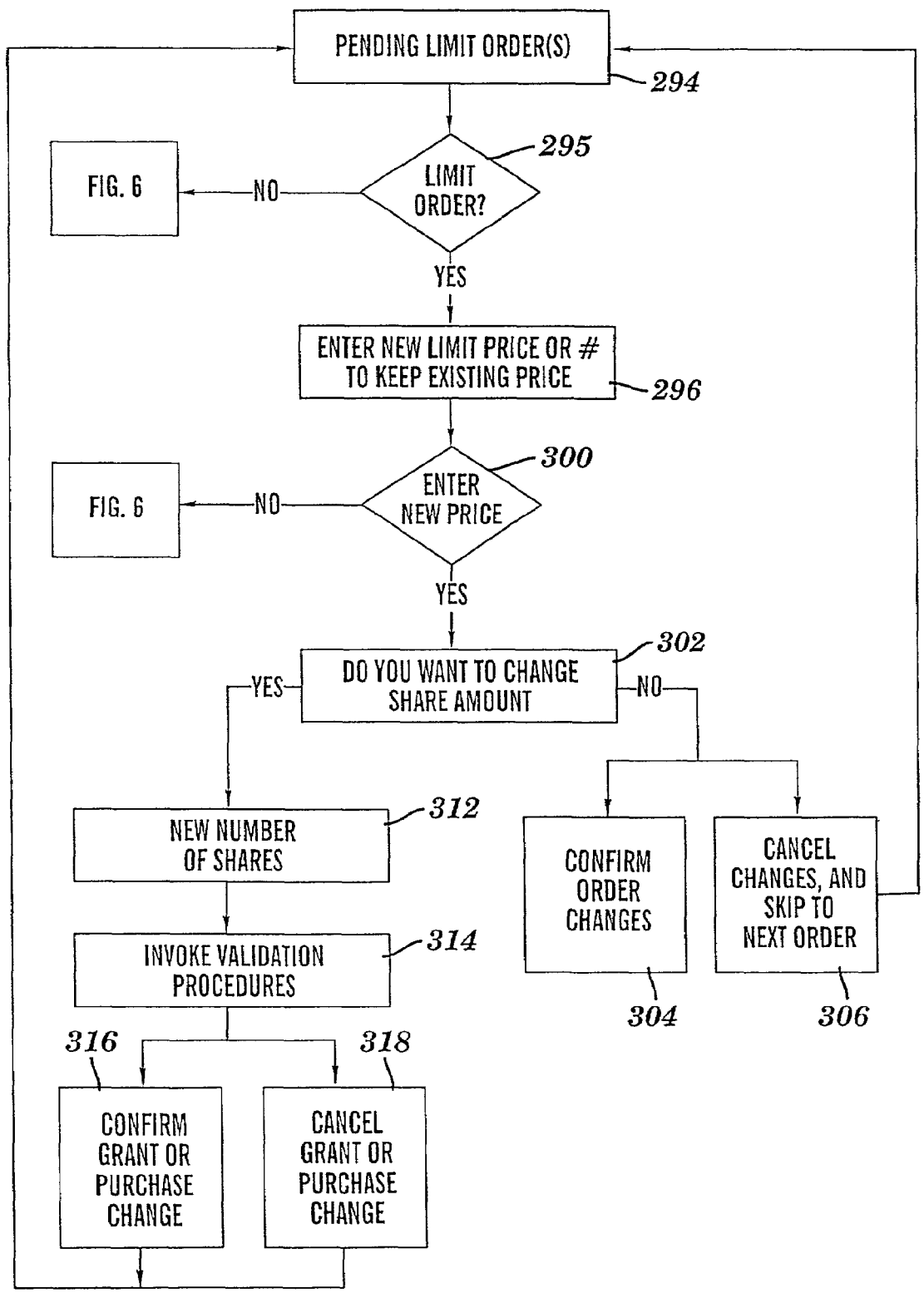
FIG. 13 is a flow diagram depicting system logic for modifying a limit price(s)

Referring now to FIG. 13, the logic for a change limit order function (selected from block 286, 290 of FIG. 12) is shown. For each limit order 294, system logic confirms that a valid limit order 296 exists. Assuming a positive response, participant 10 is prompted to enter a new limit price 298, 300, queried whether to change the option/share amount 302 (which requires cancellation and entry of a new order), confirm or cancel order changes 304, 306, enter a number of shares 312 and invoke validation procedures 314, 316, 318, as discussed above. All canceled or modified orders are forwarded to trading system 12 for transmission to exchange 28, or, where exchange 28 is closed, held until reopening.

FIGS. 14-23 provide further illustrations of exemplary web-based interfaces.

FIG. 14 illustrates an order entry display 370 that is presented to participant 10 to collect information for place order function 210 (FIG. 9). Display 370 includes for each grant: a grant selector 372, a grant date 374, an option price 376, exercisable shares 378 and a shares to be sold entry 380. In addition, order entry display 370 includes an order type entry 382 (e.g., limit, market, etc.), a price entry 384 (e.g., for a limit order), a proceeds entry 388 to direct finance system 4 where to distribute proceeds, and review order and clear order selections 390. A duration entry 386 may be provided to delineate a duration for the order (e.g., good-till-cancel (GTC)). This entry is set by an agent of the financial services organization, and is determined by the company. Selections may also be provided for exercise methods, e.g., same day sale 381, sell to cover 383, sell to raise shares 385, sell to raise cash 387, and cashless 389.

FIG. 15 illustrates a review order display 400 that may be provided, for example, by interface system 38. Review order display 400 includes a statement of the order 402 including type, limit price (if any), number of shares, grant number, grant date, option price, etc. Participant 10 may submit the order by selecting the 'submit order' button 404, or select "reject" to reject the order.

FIG. 16 illustrates a cancel order display 410 that may be provided, via confirmation system 44. Cancel order display 410 may include a statement 412 including facts about the order, and cancellation options 414 such as 'full cancel' or 'cancel replace' with a 'new price' entry. Participant 10 may select to 'initiate cancellation' 416 or 'reset' 418 the cancellation order information.

FIG. 17 illustrates a grant information (detailed) display 420. Grant information display 420 provides detailed information regarding a grant, for example, grant number, grant date, grant price, option type, options granted, options exercised, options exercisable, exercise date, option price, shares exercised, sales price, option cost, commissions, cost of grant, etc. A vesting schedule may also be shown indicating a vesting date or dates and the like.

FIG. 18 illustrates a trade summary display 424 that provides detailed information regarding any number of trades including cancel order status, sequence number, entry date, quantity, status, order type, price, execution date, etc. FIG. 19 illustrates a detailed trade summary display 426 of one of the orders displayed on trade summary display 424 of FIG. 18. Exemplary features of the detailed trade summary display 426 include sequence number, order date, order time, status, order type, open quantity, price, cumulative executed, and the like. Another table may be provided that details the grant information that is part of the order.

Figure 21:
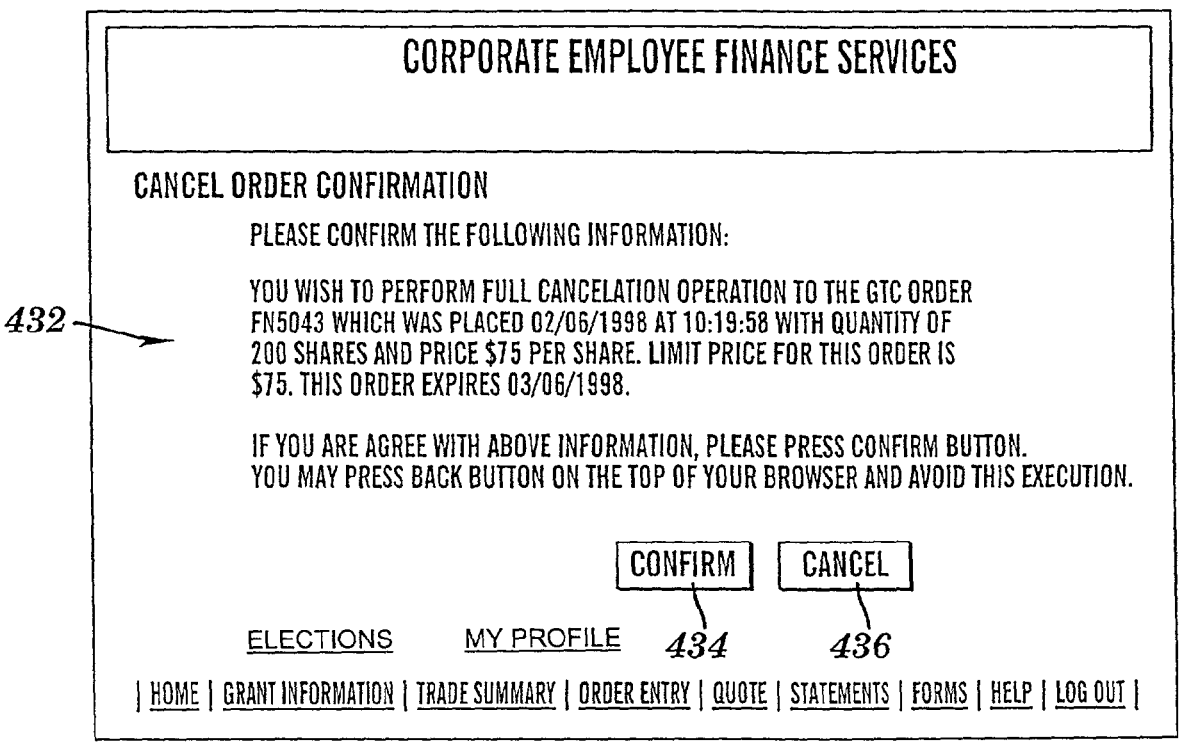
FIG. 21 is a display of a web-based interface system for cancel order confirmation.

FIG. 20 illustrates an order confirmation display 430 that provides detailed information regarding any order such as date submitted to trade system 12, reference number, etc. Links to additional information may also be provided, such as link to a home page, grant information, trade summary, check status, order entry, quote, statements, forms, help, and log out. FIG. 21 illustrates a cancel order confirmation display 432 that provides detailed information regarding a canceled order including, for example, type of cancellation, type of order, order reference number, date placed, time placed, quantity price, limit price (if any), order expiration (if any), etc. From display 432, participant 10 may choose to confirm the order by selecting 'confirm' button 434 or cancel by selecting 'cancel' button 436. FIG. 22 illustrates an order cancellation display 440 created by confirmation system 44 to confirm cancellation of an order.

FIG. 23 illustrates an updating optionee (i.e., participant 10) information display 450 that may include fields for changing information regarding a participant 10 in a known fashion. The display may include security information, E-mail addresses, and grant acceptance, and election information.

The present invention also includes a method for automatically processing transactions made pursuant to at least one employee stock plan, the method comprising the steps of storing participant information in a nonvolatile database 22 of an administration system 6; transmitting the participant information to a volatile data storage 32 of a finance system 4; implementing transactions with finance system 4; and transmitting updateable transaction information to the nonvolatile database 22 of the administration system 6.

Another feature of the present invention is a web reporting system (WRS) that enables the running of self-service reports. Advantageously, the WRS streamlines report delivery to corporate clients. This system is used with a computerized communication means as discussed above. Essentially, web reporting system affords corporate employers the ability to run reports against a database of various employee stock plans. Using the Internet and web-based technologies, administrative reports are made available to corporate clients on-demand, as necessary. The database, which contains data used in generating the reports, may be maintained by the financial services organization or by the client corporation. For example, the financial services organization may have fully administered corporate clients, where the organization maintains the administrative database and is contractually required to generate and deliver reports, or partially administered clients that maintain ownership of their administrative database such that the organization is not contractually required to run reports.

In the embodiment described herein, WRS users may include Corporate Client Representatives (CCR) (an external user such as a representative of a corporate client), Corporate Employee Financial Services (CEFS) Administrators (an internal representative of the financial services organization), Web Reporting Administrators (WRA) (an internal representative, with the responsibility for creating/modifying corporate and user profiles, re-enabling locked out users, etc.), and SubWeb Reporting Administrators (SWRA) (a supervisor with responsibility for the administration of specific client plans).

Figure 24:
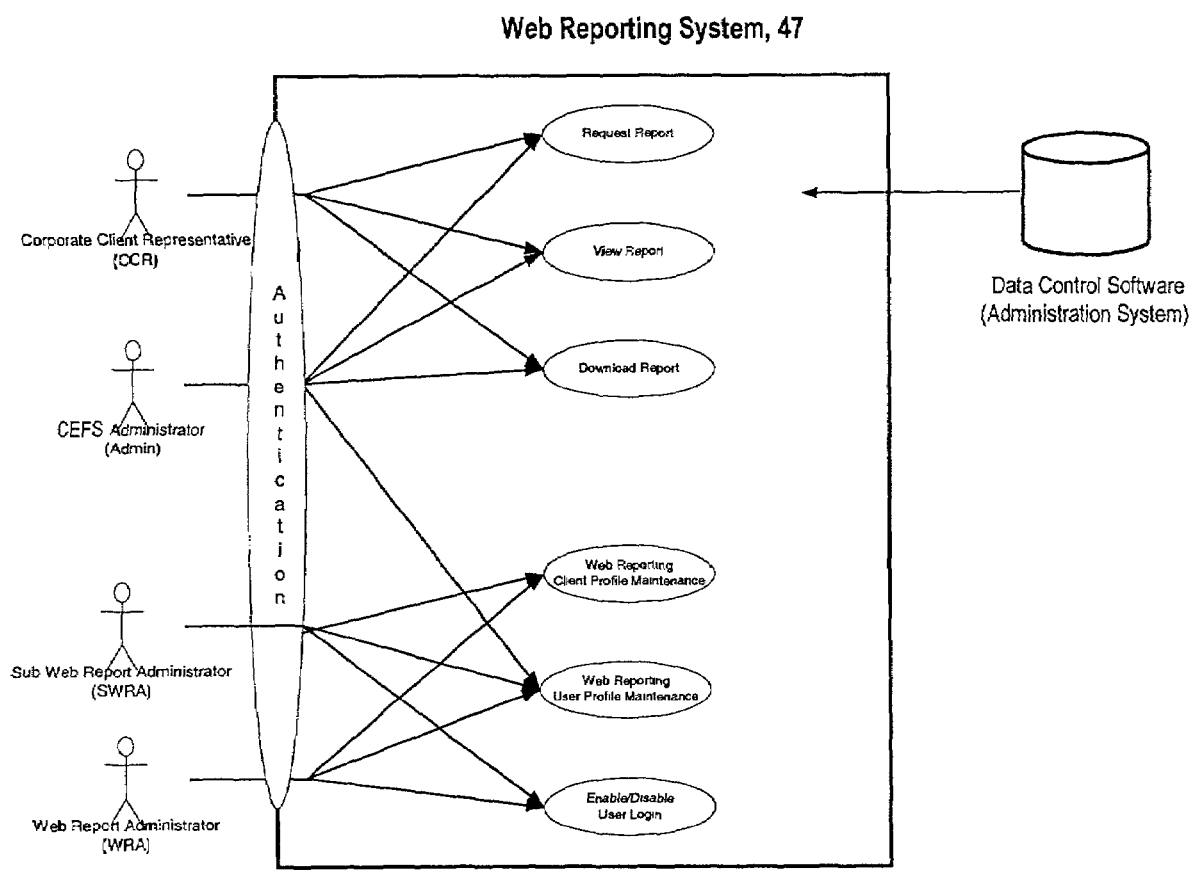
FIG. 24 illustrates a web reporting process overview.

FIG. 24 illustrates a web reporting process overview. Users are authenticated and offered entry to the system via an authentication process which is described in greater detail in U.S. Ser. No. 09/712,358, the disclosure of which is expressly incorporated herein by reference. Once a user has gained entry to the system (i.e., successful login), he or she can perform functions such as requesting reports, viewing reports, downloading reports, client profile maintenance, user profile maintenance, and controlling user logins.

After logging in, the user is shown the "main page" applicable to their user role and entitlements. The user's access to different functions can be controlled through entitlements. Entitlement identification is a process that correlates a user with specific system functionalities. Details of entitlement levels and use are described in U.S. Ser. No. 09/712,358, the disclosure of which is expressly incorporated herein by reference.

The WRS provides the ability to add new company profiles to the system, or modify or delete existing profiles. All CCRs (external users) are associated with a single company defined within the WRS. This association allows the system to properly determine which reports and system functions a user is entitled to access. Company profiles may also be enabled and disabled. For example, a company may want to temporarily prevent all users from accessing reports through the WRS (e.g., to prevent generating erroneous reports during a merger). Disabling a company profile does not delete the company profile—it simply sets an indicator that is used after the login process to prevent a user from further accessing the site.

In addition, the invention provides a process for adding/modifying/deleting a user profile. Once a company profile is entered into the WRS, user profiles are created which are connected with that profile. User profiles describe various information such as login and contact information, and system entitlements. Accordingly, all users must have an associated user profile. At a minimum, every user must be associated with the following information: user login ID, full user name, password, and company name and/or organization name.

As with company profiles, user profiles can be disabled to deny a user access to the system for various reasons, such as three failed login attempts.

Different users are accorded different displays after login. By way of illustration, a CCR will view the CCR main page, a CEFS Administrator, the CEFS administrative main page and SWRA/WRA's, the SWRA/WRA main page. From these screens, CCRs can access all entitled functions in the WRS including: run reports, view reports (including download & publish), download reports, publish reports, view report queue, and change password. Similarly, CEFS Administrators are given access to five major functions: run report, finished report, report queue, change my password, sub administration, and user admin and all SWRAs/WRAs are given access to seven major functions: run report, finished report, report queue, user profile, change my password, disable site, and user admin.

Figure 25:
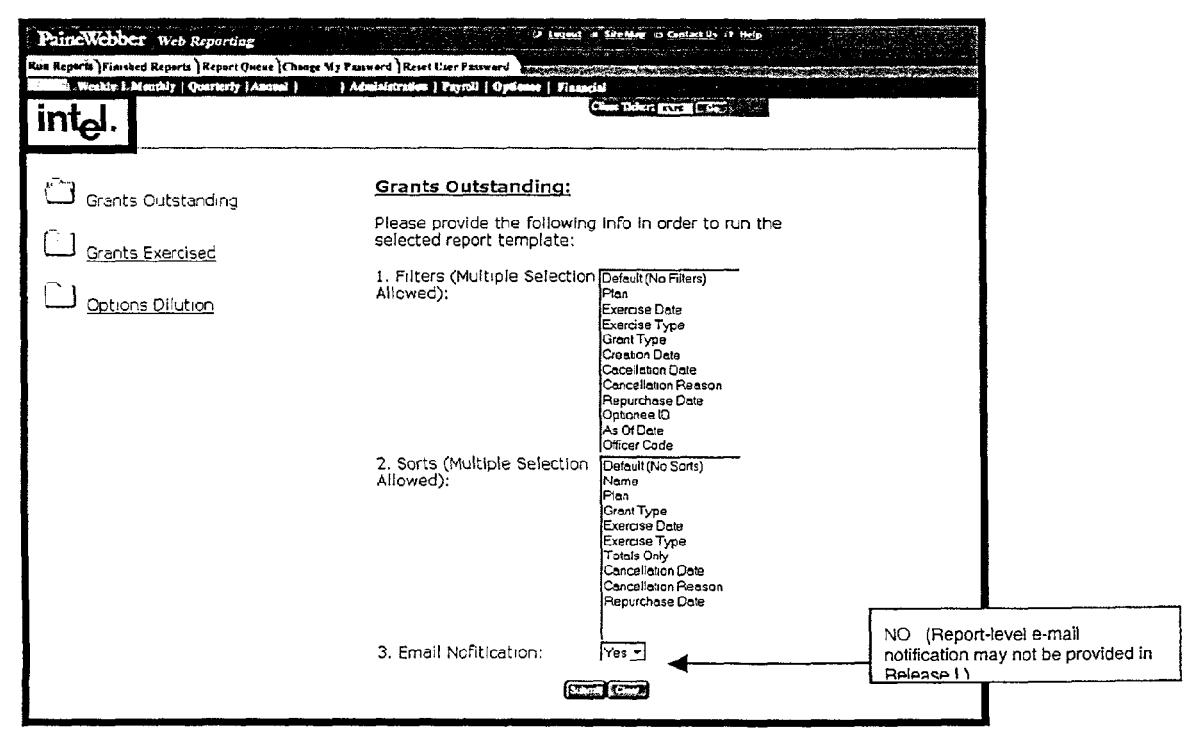

Report templates contain the formatting, data access and business calculations required to generate a finished report suitable for printing and/or viewing. These templates are run by the system to generate finished reports. As used herein, report templates refer to report executable files, which are passed to a reporting engine and executed. The output of this process is a finished report snapshot that is suitable for printing or viewing. Examples of report templates include daily reports, weekly reports, monthly reports, gapped reports and non-standard daily reports. All details pertinent to option exercise and share sale (e.g., exercise summary, broker summary, tax details, tax summary, tasks for agent summary, capital accounts distribution) may be incorporated into the templates. FIG. 25 illustrates a screen display for running a report template. The system provides a list of pre-defined reports from which a user can choose, such as grants outstanding, grants exercised, and options dilution.

Filters may be used for reports, e.g., on the optionee record, including optionee ID, country, officer, subsidiary, location, title, terminated/not terminated, and user codes. Moreover, sorting criteria may also be selected so that the report results are sorted as desired.

Once a report has been run and a finished report produced, users view the reports with web browsers or a downloaded supported file format on a local desktop system. Viewing reports triggers an audit trail record that should contain, at minimum, the user login ID, timestamp and finished report being viewed. The web server log may suffice. Downloading a report is very similar to viewing a report as a report template must have been previously executed, resulting in a finished report(s). Visually, a finished report is available for downloading when the appropriate graphic icons appear on a user's page, at which time they can simply click on the icon to initiate the downloading process.

Downloading finished reports causes the entire contents of a finished report to be transmitted to a user's browser (as opposed to the page-by-page viewing of DHTML—Dynamic Hyper Text Markup Language—reports) as one file. Report downloads may be supported for, e.g., the CSV (Excel compatible) and PDF formats.

Once a report template has been run and a finished report generated, the report may be published to other users having entitlement to that report. In the present example, the publishing process is automatic for external users such as CCRs, —reports run by one administrator become available to all administrators from that same company. By clicking an icon, the user is shown a publishing page that identifies all WRS users that may view the report(s). The user must explicitly indicate the user(s) or group(s) that they want to able to view the report(s).

After a report has been run, there are occasions where data errors may be detected. Through the WRS, a user may permanently delete a finished report from the system; however, this only affects the specific report snapshot—the report template is not altered in any way.

After a report run request is received by the WRS, it must be scheduled before it is actually sent to the reporting engine. Until that time, the request remains within the WRS run queue. Viewing the report queue allows a user to view the status of outstanding run requests.

Most operations that take place in the WRS are logged to an audit file. This file can be used to confirm various user actions and act as a trail for system changes made by users.

If for some reason, a company does not want users to access the site at certain period of time (to prevent generating erroneous report generation during a merger, for example), a disable/enable site function may be used.

Accordingly, the web reporting system provides a means by which client companies can interact directly with finance system 4.

The present invention also provides on-line forms that may be completed via the Internet. This allows participants to submit forms such as wire instructions and authorizations electronically. Exemplary forms include stock option activation forms (W-8's and W-9's), U.S. and non-U.S. wire instructions, and electronic share transfer requests.

All on-line forms may be made available to a participant via the home page of the employer's stock plan web site. Links are provided to create/change W-8 activation forms, create/change W-9 activation forms, and obtain W-8/W-9 activation history. When the participant selects create/change link, the system presents the user with a page to choose a W-8 or W-9 form if one has not already been created, or the current form-on-file. The participant can make changes to the form and submit it electronically. In addition, the system allows a participant to change from a W-8 to a W-9 election or vice versa. Where this occurs, the system automatically resets volatile data storage 32 to reflect the change, as well as the mainframe computer of the financial services organization. If the participant selects the history link, a list containing the dates and time a form was created is displayed, with links to the forms to enable the participant to view them.

International and domestic wire forms are updateable forms that contain the spectrum of information necessary to wire transaction proceeds to U.S. or non-U.S. destinations. FIG. 26 illustrates the available fields on a non-U.S. wire form. As with the W-8/W-9 forms, the system presents a blank form if one has not been created, or the current form on file. A participant may opt to replace the current form on file with the new form parameters. In addition, a participant may use the form to associate wire instructions for a single transaction or for all future transactions. The system automatically updates volatile data storage 32 with all new/revised wire instructions.

The participant may also obtain forms via a download from the Internet and via an Interactive Voice Response (IVR) feature. In these instances, the participant may forward the forms to the financial services organization or designated vendor for manual entry into the system.

The invention provides a number of additional online forms, as for example, those pertaining to the disposition of physical stock certificates and electronic share transfer requests. In lieu of an online form, an online order for the physical stock certificates may be provided. Each online form has an associated link to a set of instructions for completing the form. These forms may be used to change the share distribution to the participant's limited brokerage account (the default set by the system proprietor) to a new distribution election.

The electronic share transfer request form allows the participant to provide all conventional information known by skilled artisans as necessary to effectuate electronic share transfers of proceeds. Based on the election, the system prompts the participant to complete any forms required with the election choice. In addition, the participant is given the option to apply the transfer request to a single transaction or all future transactions. The system automatically updates volatile data storage 32 accordingly. All online forms may also be available via the Intranet or a request through the IVR. Advantageously, the system also accommodates requests for distribution elections via the IVR. Here, a participant may use options in the IVR to request an electronic transfer request, and follow up by submitting a corresponding physical form (i.e., via mail or fax).

The system also provides for the distribution of shares as a physical certificate. Shares are individually registered in the participant's name and the physical certificate forwarded to the participant. A request for this means of distribution may be made via the IVR as well as through computerized communication means (e.g., Internet, Intranet).

A participant may change his or her distribution or contribution elections at any time. Or, date restrictions during the offering period may be imposed. For example, there may be a freeze period before purchase/vesting when an election is changeable, and for ESOP, there may be changes permitted after two days after the trade date (T+2).

Note that electronic transfer and physical certificate can be considered order/transaction types as a well as distribution election/share delivery selections. A distribution election is the request by a participant to have an automatic action take place upon completion of the purchase calculation/restriction lapse (vesting). The invention is designed to notify the participant upon entry into the system to make a distribution election, tax payment election. The election is stored in the database until the time of purchase/vesting. Upon completion of the purchase calculation/vesting, the shares are distributed per the participant's request. There are four permitted methods of distribution elections: deposit into a limited brokerage account (e.g., provided by the financial services organization), QUICKSale(sm), electronic share transfer, and a physical certificate(s).

QUICKSale relates to block trading, which is another feature provided by the present invention. This block trading involves "bulking" of orders from different participants, and generally refers to trading large quantities of a stock. Typically, an order for a block trade is executed over several smaller trades. The price and quantity of shares traded may change for each execution. The price assigned to shares sold as part of the block trade may be a weighted average of the multiple executions.

With specific reference to block trading for ESPP's, this is accomplished when a participant elects a "QUICKSale" prior to a purchase, where the purchase shares are then sold on or close to the purchase date. This function is also used for RSA's at vesting when participants have chosen sell all, sell remaining, sell to cover as tax payment methods and/or distribution methods.

The following embodiment describes the procedure followed by an operations staff member of the financial services organization in effectuating a block trade via a web-based interface. At the outset, the staff member must be authenticated as previously described. In addition, the staff member conducts all executions while interacting with a Trade Up front Block Allocation (TUBA) operator by conventional means (e.g., phone). The TUBA operator may be considered to be part of the trading system 12 of FIG. 1. This is an application that allocates large trades to many accounts, giving one average price. The trader works the orders (sells shares) throughout the day. The TUBA system may be connected to the finance system 4 via, e.g., a +112 series.

A block trade home screen presents untouched block trades at the top of the screen. This information shows the current status of each block trade for a given corporation. This details the number of days trading has taken place, number of purchases/vestings, number of shares, etc. Different categories are presented at the home screen, including new block trades (for fresh block trades), open block trades (block trades on which trading has commenced but for which all shares have not sold), filled block trades (trades whose all shares have been sold), and sold to market (shares not subject to block trades but submitted to market via the trading system 12 and the exchange 28 instead of through the block trade system).

New block trades are commenced by adding executions. By clicking on a date, a details screen is displayed. The data required to populate this screen is obtained from the executions the trader gets by selling his shares on the market. This process continues until all shares are sold. After the "date" link is clicked, the block details page opens, where the operations (OPS) staff member can enter information/executions on the trades.

A link to Section 16 lists all participants not permitted to be part of a block trade. Section 16(b) of the Securities Exchange Act of 1934 refers to short-swing profit recovery rules. Clicking the "Section 16" link brings up a page with the details for all the Section 16 participants.

FIG. 27 illustrates a block trading screen. The operations staff member enters the number and price of shares as provided by the block trader. The quantity of shares that the staff member enters on this page is the number of shares that may be sold in this execution. This page also shows the number of shares that are to be sold, broken up into details of "sell all" and "sell remaining" for RSA, and sell all for ESPP. Data displayed on the page is obtained by executing database stored procedures.

The staff member can abort the block trade process and trade all the shares on market by clicking on a "submit trades to market" button, which goes through trading system 12 and exchange 28. Note, however, that once the staff member creates an execution, he or she can no longer abort the block trade.

As mentioned, the staff member enters the values provided by the trader. The block trading system allows the staff member more than one execution for a group of shares. Where a block is subject to more than one execution, the staff member can type in values for quantity and price and then click the "add execution" button. This reflects the trade the block trader has executed in his general ledger account. The execution is then shown on the screen with the number of executed shares shown as deducted from the total number of available shares and the average price of the execution calculated and displayed.

When the trader advises the staff member that the order is filled, or the market has closed and the order has not been filled, the staff member clicks on a "create TUBA allocation" button. TUBA allocation data details are generated and sent via message queue to finance system 4, and volatile database 32 at the mainframe computer is automatically updated. All TUBA allocation data is driven by the information previously entered by the staff member and the distribution and tax payment method elections chosen by the participant.

The staff member can then click on the "send TUBA allocation" button, which causes the share sale, where the block trade shares sold with average prices in the individual accounts. Thereafter, a TUBA confirmation presentation display is presented to the staff member.

As previously discussed, the present invention accommodates a number of different ESOP, ESPP and RSA clients, each with different system requirements. Referring specifically to ESPP clients, certain unique functionalities are required, as for example, enrollment procedures. ESPP client companies have the option of allowing participants to enroll in the company's ESPP plan via the Internet or IVR. Participants enrolling with either make dollar or percentage of salary contribution elections during the enrollment period.

In a standard enrollment process: (1) all participants eligible to enroll in the offering period are provided by the company in an "eligibility file", which contains authentication information for the employees as they may not yet be participants in the finance system 4 (need to create the user); (2) the eligibility file is loaded into the finance system 4; (3) participants enrolling in an offering period are validated against the eligibility file, and create themselves as valid users of the finance system 4; (4) the enrollment and distribution election stored in the participant record; (5) during and at the completion of the open enrollment period, the enrolled participants are reported back to the company in the form of a file; (6) participants can make changes in enrollment elections during the offering period (as permitted by the enrollment parameters), which typically is a three to twenty-seven month period during which employees can buy stock through payroll deductions; (7) the per participant number of changes made is stored on the participant record, and enforced by finance system 4; and (8) election changes are reported back to the company in the form of a file.

In an alternative enrollment process: (1) a client company provides an enrollment file which may contain only participant ID's and the offering period ID; (2) enrolled participants are loaded into the finance system; (3) participants cannot make enrollment changes—they can make distribution elections changes; and (4) the company may provide additional enrollment participants during the offering period.

The participant record includes the following enrollment information: (1) offering period ID; (2) enrollment date; (3) enrollment dollar or percentage election; (4) last date election changed; and (5) the number of changes.

Referring more specifically to the previous discussion, a web-based enrollment process may be provided. In this instance, a participant accesses a company stock benefit site where he or she is presented with a logon page such as previously shown in FIG. 3. If the user does not currently have a password, the system then displays a page that requests the participant's employee ID or social security number. When the participant clicks on the "submit" button, the system searches for an associated ID in the eligibility file. If the ID is not found, a message is displayed informing the participant that they are not eligible to participate and to contact their human resources department. If the ID is found, the authentication questions are presented. The participant answers the questions and the fields are matched against company provided values. If these do not match, a message is displayed informing the participant to contact the CSR of the financial services organization via telephone.

Where the authentication data matches, the user is asked to choose a PIN, then after accepting any needed agreements/ authorizations, the participant may proceed to provide the percent or dollar elections to enroll in the new offering period, change the elections for an offering period, and stop or withdraw contributions. Once these fields are populated, the system allows the participant to elect distribution elections.

The distribution elections are specific to the offering period. Participants may be enrolled in more than one offering period at a time (e.g., current and next). The key identifier for the distribution elections is the offering period ID. Participants can choose to have the distribution method (QUICKSale, limited brokerage account, certificate, or electronic share transfer) applied to the current offering period or all future offering periods.

Prior to making the distribution elections, and for participants that have not previously enrolled in the new offering period, the participant may be notified of any messages via a notification page. For example, the participant may be notified of stock option/restricted stock grants acceptance pending, stock option grants expiring, restricted stock tax election not chosen, cash payment due, and an ESPP open enrollment/distribution election notification. The participant must acknowledge each notification before proceeding.

If the participant is enrolling, they are brought directly to an enrollment election page. If they are changing their election, they can select a "change elections" tab. If the participant is changing a contribution election in an offering period, they can select an offering period from an offering period table, change elections as desired and click on "submit" to approve the elections. If the participant elects to stop contributing to the purchase plan, the system changes the future contributions (percent or dollar amount) to zero, and either holds the funds or provides an automatic refund. If the participant withdraws contributions, the future contributions are changed to zero. The company is generally responsible for all dollar/percentage contribution collection and refunds.

When the distribution elections are submitted and a U.S. or non-U.S. wire instruction has been elected, a link to the appropriate wire form is displayed on a confirmation page for the participant to approve or enter. Certificate elections can also be requested as can a share delivery method for available shares, both at the time of purchase or after purchase through order entry, as well as at an option exercise resulting in shares due to the optionee. The transfer distribution election method also has a link to the transfer form that must be completed prior to the purchase.

If a client company has provided a numeric authentication field for their employees on the eligibility file, an employee may enroll via the IVR. In this instance, the participant is presented with the option to logon, enroll in their company's purchase plan, or transfer to the CSR. If the participant selects the enrollment option and does not have a PIN, the system prompts for an employee ID, which may be, e.g., a social security number. If the ID is not found, a message advises the participant that they are not eligible to participate and to contact their human resources area. If the ID is found, the IVR prompts for at least one company-provided numeric field that is used for authentication. The participant's authentication data is matched against the company-provided values. If no match is found, the participant is transferred to the CSR. If there is a match, the participant is presented with a PIN entry/selection prompt, which the participant must enter twice for confirmation. Once a proper PIN and enrollment disposition is complete, the IVR allows the participant to enroll in the plan. IVR logic queries whether the participant has read and understands the plan and prospectus. If no, the participant is asked if they would like a copy of the plan and prospectus. If so, the documentation is set for mailing to their address on file, the participant is informed that they can not enroll unless they understand the prospectus, and then the system exits the participant from the IVR. If the participant agrees to the prospectus, system logic prompts a selection of the new offering period (based on date), and a dollar amount deduction or a percentage of salary as indicated in the company setup. Once the participant has provided contribution elections, system logic queries for an authorization form. The participant must have completed and submitted a W-8 or W-9 form. If not, system logic prompts the system to ask the participant how they would like to receive the form, e.g., by mail or fax, and the participant is exited from the system. The W-8/W-9 query may come before the contribution election but after the prospectus.

Once the enrollment process is completed, the participant is prompted for a distribution election. Note that the distribution election process should be accessible independently of the enrollment process since the financial services organization may not manage the enrollment process for some client companies. If the company has elected to provide the financial services organization with an enrollment file, the enrolled participants skip the above process and go directly to distribution elections options. Associated distribution election prompts include: (1) leave the shares in a limited brokerage account; (2) execute a QUICKsale, where the purchased shares are sold on or close to the purchase date and the funds are delivered to a limited brokerage account, or via check or wire; (3) physical certificate, where the purchased shares are issued as certificates to the participant; or (4) electronic share transfer.

Note that the distribution elections are specific to the offering period, and the participant can be enrolled in more than one offering period at a time (e.g., current and next). Also, the company can decide what choices are available to the participant.

When the elections are complete, the system provides a link on a confirmation page (or, with the IVR, a prompt on a confirmation message) to allow the participant to provide domestic or international wire instructions, and any other necessary forms (e.g., W-8/W-9, wire, electronic share transfer request forms). Where the forms must be completed offline, system logic asks the participant if he or she would like them sent via fax or mail. The participant may also be exited from the contribution/distribution election area of the system and returned to the main menu. The W-8/W-9 should be on file prior to the participant making a contribution or distribution election. The forms would have been presented prior to allowing the participants to make either election. If these forms have been completed, system logic provides the participant with a verification of the summary of the participant's elections for the plan that they are required to confirm or reject. If the verification is rejected, the participant is returned to the election prompt. If confirmed, the system provides a confirmation pursuant to participant election via mail, fax, or e-mail. At that time, system logic brings the participant to the main menu.

To assist in managing the enrollment process, a distribution election report and an enrollment/contributions elections report may be provided for delivery to the client companies' payroll departments. The report may summarize participant activities, such as enrollments, stopped contributions, and contributions amounts. The reports may be generated at the close of the enrollment period, and on a regular basis during the offering period, based, e.g., on the companies' payroll cycles.

The present invention also provides a checks and journal system that manages monies and shares transfers between accounts within a financial services organization and process as monies on settlement dates as checks, account deposits or wire transfer payments.

Generally stated, the check and journal process starts with the creation of an order. As previously discussed, after the order is entered, it is routed to the trading system for execution at the exchange. Upon order execution, the trade is transmitted back to finance system 4. At 4:30 p.m. on the trade date, a system outside of the present invention calculates the final commissions for all trades executed that day and sends this information to finance system 4. This triggers a feed of the trade/exercise information to administration system 6, which calculates the taxes for the trade and sends this information back to finance system 4. This completed information is then used to create checks and journal entries.

Journal entries initiate the movement of shares or funds between accounts. They detail how a trade affects the associated account(s). The journal process is divided into a user interface and background functions. The background functions provide data creation, manipulation, calculations, formatting, and transfer. Journal entries are provided by the system proprietor either manually or automatically. The background functions fall into two categories, namely those that run on the trade date (T) for creating the journals, and those that run on settlement date for reconciliation the journals. The user interface provides a system administrator the capability to review, approve, and delete journals.

In a web-based embodiment, the user interface includes a principal screen (FIG. 28) and supporting screens. The principal screen provides summary details for the client company and underlying details for the checks and journals and accordingly, allows a client company to quickly reconcile against its wire report. If the client company's summary information does not reconcile, the details are provided on this same screen. Each account journal can then be reviewed and details checked. Supporting screens can provide further details for the reconciliation if needed. An auto reconciliation process may also be provided. Here, the system automatically reconciles each account journal and wire report.

The checks and journals system also provides for trade correction. Essentially, the system proprietor can edit trade details based on the plan type. For example, for an ESOP plan, editable fields may include grant number, grant date, withholding amounts for federal tax and state tax, brokerage commissions, shipping and handling, SEC fees, and net proceeds. The correction of a trade results in corresponding modifications to journals and is provided to the bookkeeping system. This function can be performed on trade date through settlement date. The correction is captured, and an audit trail is available for future tracking of the trade. If the correction impacts the journals (or the checks as discussed below) this system automatically is updated.

Figure 29:
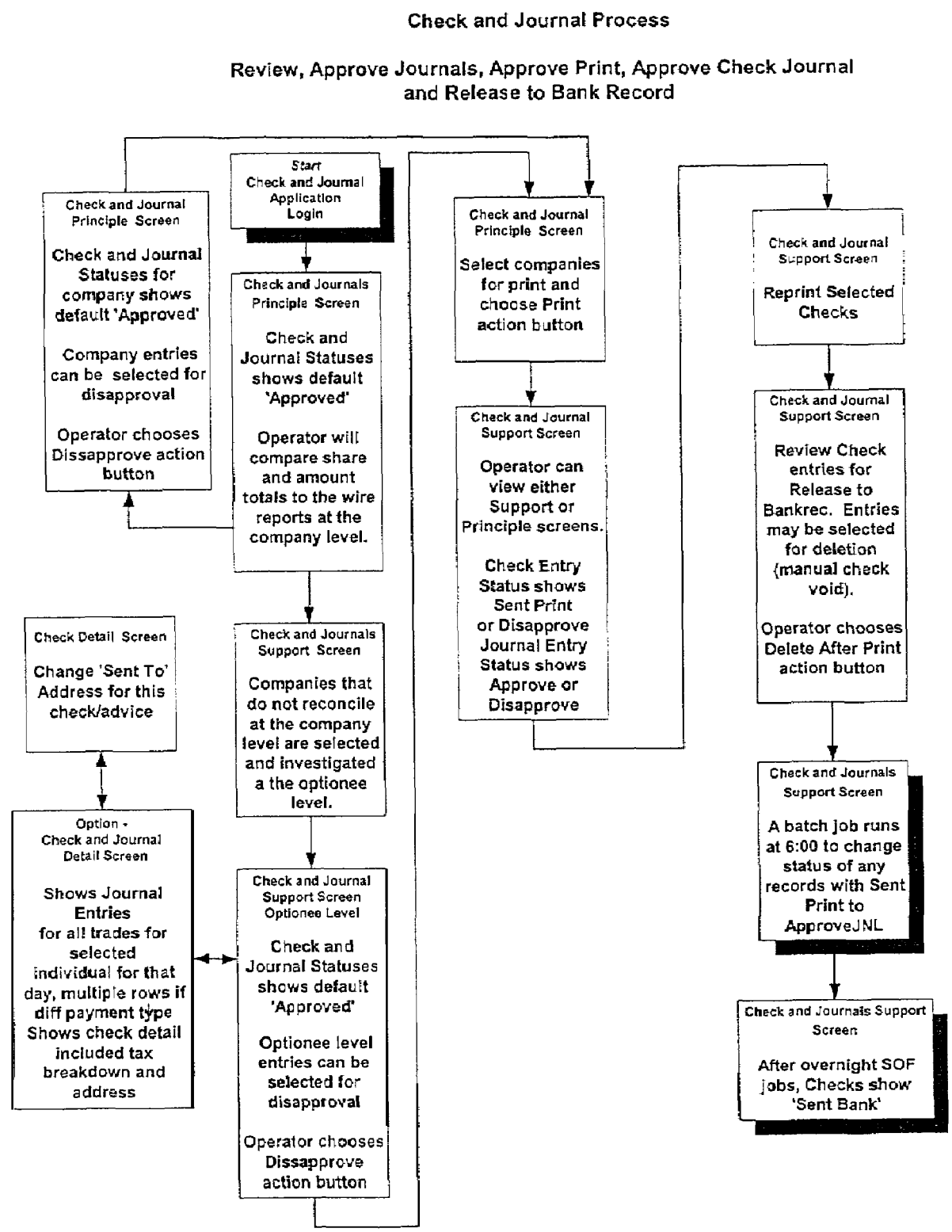
FIG. 29 illustrates a checks and journals process overview.

As a result of a trade, monies may be available in a participant's limited brokerage account. The system affords the participant the option to elect to keep the funds in the account, transfer the funds via a domestic or international wire, or receive the funds by a check. In the web-based interface, the procedure for a check distribution begins with the selection of a date. When the date is entered, the system generates a list of all monies that need to be processed for a given date (e.g., T+1 settlement date). The system correlates a check distribution election with each participant trade. Where a positive response is identified the system automatically generates and prints checks. The checks are approved, and released as appropriate. For each check that is generated, the system creates a journal entry which is then validated against a wire report. An overview of the review and approval of journal entries and checks is provided in FIG. 29.

All data generated from the checks and journals system is transmitted back to administration system 6 pursuant to the daily data transfer. The participant information is updated based on the check and journal processes.

The checks and journals system supports the running of summary and detailed reports for single or multiple participants or client companies. In addition, journal entries are linked with trade/exercises information such that, if one is changed, it is reflected in the others. For example, if a journal is deleted, the check is automatically deleted.

Accordingly, it can be seen that the present invention provides a full-featured system and method for implementing employee stock plans. The invention provides a number of features including: running of self-service reports, the provision of online forms for stock certificate, disposition electronic transfer requests, wire instructions and authorizations; it enables block trading of securities; it provides an efficient process for issuing checks, and making corresponding journal entries; it enables web-based and interactive voice response (IVR) interactions; it provides enhanced personal identification number (PIN) processes; and enables customization of features by employer/corporate clients

Having thus described the invention in full detail, it will be recognized that such detail need not be strictly adhered to but that various changes and modifications may suggest themselves to one skilled in the art, all falling within the scope of the invention, as defined by the subjoined claims.

What is claimed is:

1. A system supporting an employee stock plan comprising:
    an administrative server system that receives and stores employer-provided information concerning participants in an employee stock plan limited to acquisition of and trading in one or more of employer-issued stock and options on employer-issued stock;
    a trading server system that executes transactions on a public exchange;
    a finance server system communicably coupled to the administrative server system and the trading server system over a communications network;
    the finance server system receiving the employer-provided participant information from the administrative server system;
    the finance server system automatically creating and storing, without participant action, limited brokerage accounts based on the employer-provided participant information, the limited brokerage accounts being funded with one or more of employer-issued stock and options on employer-issued stock and used by the participants to initiate transactions through the trading server system solely in connection with the employee stock plan;
    the finance server system presenting an interface through which the participants use the limited brokerage accounts to initiate one or more transactions in connection with the employee stock plan through the trading server system, the one or more transactions comprising one or more of trades involving employer-issued stock and exercising of options on the employer-issued stock;
    the trading server system conducting the one or more transactions initiated by the participants using the limited brokerage accounts;
    the finance server system updating the limited brokerage accounts with information concerning the one or more transactions;

the finance server system transmitting information concerning the updated limited brokerage accounts to the administration server system; and the administration server system updating the employer-provided participant information stored in the administrative server system with the information concerning the updated limited brokerage accounts.

2. The system of claim 1 wherein:

the finance server system generates reports based on the one or more transactions conducted through the trading server system using the limited brokerage accounts.

3. The system of claim 2, wherein the finance server system creates profiles for the participants associated with an employer profile and generates the reports in accordance with respective user profiles.

4. The system of claim 2, wherein the finance server system presents an interface through which a report template is selected, the finance server system generating the reports in accordance with the selected report template.

5. The system of claim 2, wherein the reports relate to at least one of grants outstanding, grants exercised, or options dilution.

6. The system of claim 2, wherein the finance server system presents an interface through which at least a filtering criteria parameter to filter the reports and sort criteria for sorting the reports are selected.

7. The system of claim 1, wherein the employee stock plan comprises at least one of an employee stock option plan (ESOP), a restricted stock award (RSA) plan, and an employee stock purchase plan (ESPP) that is administered by a financial services organization.

8. The system of claim 1, wherein the finance server system presents an interface through which the participants select a distribution election for the employee stock plan.

9. The system of claim 1, wherein the finance server system presents an interface through which the participants select a contribution election for the employee stock plan.

10. The system of claim 1, wherein the finance server system presents an interface through which the participants select a tax election for the employee stock plan.

11. The system of claim 1, wherein finance server system presents an interface through which the participants access an online form relating to the employee stock plan.

12. The system of claim 1, wherein the finance server system presents an interface through which the participants are notified of at least one of stock option grants acceptance pending, stock option grants expiring, restricted stock tax election not chosen, cash payment due, enrollment election and distribution election.

13. The system of claim 1, wherein the finance server system presents an interface through which the participants are notified of at least one of a restricted stock award and a stock option grant/award, and enables the participant to accept, reject or defer acceptance of the award.

14. The system of claim 1, wherein the finance server system presents an interface through which block trades are performed on behalf of the participants for shares acquired by the participants solely in connection with the employee stock plan.

15. The system of claim 1, wherein the finance server system presents an interface through which to sell a block of shares in multiple trades on behalf of the participants for shares acquired by the participants solely in connection with the employee stock plan by entering a share quantity and price for each trade.

16. The system of claim 1, wherein the the finance server system presents an interface through which to view trade entries for the employee stock plan and to enter an approved or disapproved status for at least one of an associated check and an associated journal, the check and the journal being linked so that an entry made the journal is automatically carried over to an entry for the check.

17. A method for supporting an employee stock plan comprising:

receiving the employer-provided information concerning participants in an employee stock plan over a communications network from an administrative server system, the employee stock plan being limited to acquisition of and trading in one or more of employer-issued stock and options on employer-issued stock;

automatically creating and storing, without participant action, limited brokerage accounts based on the employer-provided participant information, the limited brokerage accounts being funded with one or more of employer-issued stock and options on employer-issued stock acquired and used by the participants to initiate transactions through a trading server system solely in connection with the employee stock plan;

presenting an interface through which the participants use the limited brokerage accounts to initiate one or more transactions in connection with the employee stock plan through the trading server system, the one or more transactions comprising one or more of trades involving employer-issued stock and exercising of options on the employer-issued stock;

updating the limited brokerage accounts with information concerning the one or more transactions; and transmitting information concerning the updated limited brokerage accounts over the communications network to the administration server system in order to update the employer-provided participant information stored in the nonvolatile data storage of the administrative server system.

18. The method of claim 17, further comprising presenting an interface through which the participants make a distribution election selection related to the employee stock plan.

19. The method of claim 17, further comprising presenting an interface through which the participants make a distribution election selection related to the employee stock plan, wherein the distribution elections include at least one of: maintaining funds in a limited brokerage account stored in the finance server system, transferring funds to an external account, receiving funds via a check, selling shares via block trading, and obtaining shares via physical certificate.

20. The method of claim 17, further comprising presenting an interface through which the participants make a contribution election selection related to the employee stock plan.

21. The method of claim 17, further comprising presenting an interface through which the participants make a tax election selection related to the employee stock plan.

22. The method of claim 17, further comprising presenting an interface through which the participants access an online form associated with the employee stock plan.

23. The method of claim 17, further comprising presenting an interface through which the participants access an online form associated with the employee stock plan, the online form including at least one of: a wire transfer instruction form, a stock option account activation form, and an electronic share transfer form.

24. The method of claim 17, further comprising presenting an interface through which the participants select at least one of a current enrollment period and a future enrollment period in making a selection.

25. The method of claim 17, further comprising presenting an interface through which the participants make a selection regarding at least one of: designating a payroll deduction, stopping future contributions, and withdrawing previous contributions from the employee stock plan.

26. The method of claim 17, further comprising presenting an interface through which the participants are notified of at least one of: a stock option grant pending acceptance, an expiring stock option grant, a restricted stock tax election not chosen, cash payment due, and an enrollment election and distribution election.

27. The method of claim 17, further comprising presenting an interface through which the participants are notified of at least one of a restricted stock award and a stock option grant/award, and enables the participant to accept, reject or defer acceptance of the award.

\* \* \* \* \*